US012571235B2

(12) United States Patent
Marks et al.

(10) Patent No.: US 12,571,235 B2
(45) Date of Patent: Mar. 10, 2026

(54) UNIVERSAL LATCH AND SENSOR SYSTEM

(71) Applicant: Southco, Inc., Concordville, PA (US)

(72) Inventors: Zachary Marks, Concordville, PA (US); Douglas Griesbach, Concordville, PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 18/038,599

(22) PCT Filed: Nov. 24, 2021

(86) PCT No.: PCT/US2021/060719
§ 371 (c)(1),
(2) Date: May 24, 2023

(87) PCT Pub. No.: WO2022/115525
PCT Pub. Date: Jun. 2, 2022

(65) Prior Publication Data

US 2024/0011329 A1 Jan. 11, 2024

Related U.S. Application Data

(60) Provisional application No. 63/118,389, filed on Nov. 25, 2020.

(51) Int. Cl.

| | |
|---|---|
| ***E05B 63/00*** | (2006.01) |
| ***E05B 17/10*** | (2006.01) |
| ***E05B 47/00*** | (2006.01) |

(52) U.S. Cl.
CPC .......... *E05B 63/0056* (2013.01); *E05B 17/10* (2013.01); *E05B 2047/0068* (2013.01);
(Continued)

(58) Field of Classification Search
CPC ................. E05B 63/0056; E05B 17/10; E05B 2047/0068; E05B 2047/0069; E05B 2047/0091
(Continued)

(56) References Cited

U.S. PATENT DOCUMENTS 4,583,775 A * 4/1986 Bisbing .................. E05C 3/042 292/64
5,746,459 A * 5/1998 Giroux, Jr. ............. E05B 81/22 292/341.16
(Continued)

FOREIGN PATENT DOCUMENTS

CN 107002427 A 8/2017
CN 109844247 A 6/2019
(Continued)

OTHER PUBLICATIONS

European Communication pursuant to Article 94(3) for European Application No. 21 839 717.2 dated Mar. 19, 2024, 9 pages.
(Continued)

*Primary Examiner* — Nathan Cumar
(74) *Attorney, Agent, or Firm* — Buchanan Ingersoll & Rooney PC

(57) ABSTRACT

According to one aspect of the invention, a universal latch and sensor system is provided for use with an enclosure having a panel and a frame and for latching the panel relative to the frame. The system includes a latch having a body configured to be mounted to the panel or to the frame of the enclosure. The latch also has a pawl movable relative to the body throughout a range of motion including an engaging position and a disengaging position. The system also includes a sensor having a body configured to be mounted to the other of the panel or the frame of the enclosure, the sensor also having a sensing range throughout which it is capable of sensing the pawl of the latch. The sensor and the
(Continued)

latch are configured to be mounted in any of a plurality of orientations in which the range of motion of the pawl of the latch at least partially overlaps with the sensing range of the sensor while maintaining a gap between the body of the sensor and the pawl of the latch when the pawl is in the engaging position. The sensor is configured to sense the presence or absence of the pawl of the latch when the sensor and the latch are mounted in any of the orientations and when the pawl of the latch is moved in the range of motion of the pawl to any location within the sensing range of the sensor.

10 Claims, 25 Drawing Sheets

(52) U.S. Cl.
CPC ................. *E05B 2047/0069* (2013.01); *E05B 2047/0091* (2013.01)

(58) Field of Classification Search
USPC .............................................................. 70/57
See application file for complete search history.

(56) References Cited

U.S. PATENT DOCUMENTS

| | | | | |
|---|---|---|---|---|
| 6,041,627 | A | 3/2000 | Buckland | |
| 10,304,643 | B1 * | 5/2019 | Domzalski | H01H 15/102 |
| 2004/0000799 | A1 * | 1/2004 | Wherley | E02F 9/24 296/146.1 |
| 2004/0100254 | A1 * | 5/2004 | Viitanen | E05B 17/22 324/207.26 |
| 2005/0024209 | A1 * | 2/2005 | Adams | G08B 13/08 340/545.1 |
| 2006/0187035 | A1 * | 8/2006 | Adams | G08B 21/18 340/691.1 |
| 2016/0134113 | A1 * | 5/2016 | Dushane | H02J 13/00 700/295 |
| 2017/0228953 | A1 * | 8/2017 | Lupovici | G07C 9/00896 |
| 2017/0362856 | A1 * | 12/2017 | Almomani | E05B 47/00 |
| 2018/0148958 | A1 | 5/2018 | Liu et al. | |
| 2018/0321064 | A1 * | 11/2018 | Newton | H03K 17/9545 |
| 2020/0256096 | A1 * | 8/2020 | Olkay | E05C 3/042 |
| 2020/0270903 | A1 * | 8/2020 | Stein | E05B 17/0037 |

FOREIGN PATENT DOCUMENTS

| | | | |
|---|---|---|---|
| DE | 2813029 | A1 | 9/1979 |
| DE | 102016113407 | A1 | 1/2018 |
| DE | 202016005817 | U1 | 1/2018 |
| DE | 202016005818 | U1 | 1/2018 |
| EP | 3516141 | A2 | 7/2019 |
| TW | 436568 | B | 5/2001 |
| WO | 2018054528 | A2 | 3/2018 |

OTHER PUBLICATIONS

International Search Report and Written Opinion for International Application No. PCT/US2021/060719, dated May 11, 2022, 22 pages.

Office Action (The First Office Action) issued Dec. 16, 2025, by the State Intellectual Property Office of People's Republic of China in corresponding Chinese Patent Application No. 202180091551.1 and an English translation of the Office Action. (15 pages).

* cited by examiner

UNIVERSAL LATCH AND SENSOR SYSTEM

CROSS REFERENCE TO RELATED APPLICATIONS

This application is a U.S. National Phase of PCT International Application No. PCT/US2021/060719, filed Nov. 24, 2021, which claims priority to U.S. Provisional Application No. 63/118,389, filed Nov. 25, 2020, titled UNIVERSAL LATCH AND SENSOR SYSTEM, both of which are incorporated herein by reference in their entireties for all purposes.

FIELD OF THE INVENTION

The present invention relates generally to latch systems, and more specifically to a latch system that can be used to monitor an engaged or disengaged status of a latch and an opened or closed status of a panel.

BACKGROUND OF THE INVENTION

Various latches are available for use with enclosures. Specifically, latches are available to secure a panel relative to a frame of an enclosure. There remains a need, however, for improved latch and sensor systems that detect the condition of the latch and/or enclosure.

SUMMARY OF THE INVENTION

Aspects of the present invention are related to latch and sensor systems.

According to one aspect of the invention, a universal latch and sensor system is configured for use with an enclosure having a panel and a frame and for latching the panel relative to the frame. The system includes a latch having a body configured to be mounted to the panel or to the frame of the enclosure, the latch also having a pawl movable relative to the body throughout a range of motion including an engaging position and a disengaging position. The system also includes a sensor having a body configured to be mounted to the other of the panel or the frame of the enclosure, the sensor also having a sensing range throughout which it is capable of sensing the pawl of the latch. The sensor and the latch are configured to be mounted in any of a plurality of orientations in which the range of motion of the pawl of the latch at least partially overlaps with the sensing range of the sensor while maintaining a gap between the body of the sensor and the pawl of the latch when the pawl is in the engaging position. Also, the sensor is configured to sense the presence or absence of the pawl of the latch when the sensor and the latch are mounted in any of the orientations and when the pawl of the latch is moved in the range of motion of the pawl to any location within the sensing range of the sensor.

According to another aspect of the invention, a latch system is configured for remotely monitoring an engaged status or a disengaged status of a latch cam. The latch system includes an enclosure including the panel mounted for movement relative to a frame, the panel being movable between an opened position in which the panel is open relative to the frame and a closed position in which the panel is closed relative to the frame. The latch system also includes a latch mounted to the panel or to the frame of the enclosure with the latch cam of the latch moveable relative to the panel or to the frame between an engaged position and a disengaged position, the latch cam being configured to engage the panel relative to the frame in the engaged position when the panel is in the closed position, and the latch cam being configured to disengage the panel relative to the frame in the disengaged position to allow the panel to move to the opened position. A latch cam sensor is mounted to the other one of the panel or the frame, the latch cam sensor being configured to detect an engaged status of the latch cam when the latch cam is in the engaged position and the panel is in the closed position, and the latch cam sensor being configured to detect a disengaged status of the latch cam when the latch cam is in the disengaged position and the panel is in the opened position. The latch cam sensor is configured to generate a signal indicating the engaged status or the disengaged status of the latch cam.

According to yet another aspect of the invention, a sensor system is configured for indicating an engaged status of a latch during which access to an interior of an enclosure is restricted. The sensor system includes a sensor housing configured to be mounted to the enclosure; a sensor circuit positioned within the sensor housing; a sensor positioned within the sensor housing and coupled to the sensor circuit, the sensor being configured to detect the engaged status of the latch, and the sensor being configured to generate a signal when the engaged status of the latch is or is not detected; and a light source positioned within the sensor housing and coupled to the sensor circuit, the light source being configured to selectively illuminate in response to the signal generated by the sensor when the engaged status of the latch is or is not detected, the light source being configured to be oriented toward the interior of the enclosure, thereby illuminating the interior of the enclosure, or to be oriented outwardly relative to the interior of the enclosure, thereby being visible from outside of the enclosure.

According to still another aspect of the invention, a latch system is configured for remotely monitoring an engaged status or a disengaged status of a latch cam and a closed status or an opened status of a panel. The latch system includes an enclosure including the panel mounted for movement relative to a frame, the panel being movable between an opened position in which the panel is open relative to the frame and a closed position in which the panel is closed relative to the frame. The latch system also includes a latch cam sensor mounted to the panel or the frame, the latch cam sensor being configured to detect the latch cam when the latch cam is within a predetermined distance of the latch cam sensor in any direction, the latch cam sensor being configured to generate a signal when the latch cam is within the predetermined distance of the latch cam sensor. A latch is mounted to the other one of the panel or the frame of the enclosure with the latch cam of the latch moveable relative to the panel or to the frame, the latch cam being configured to move within the predetermined distance of the latch cam sensor.

According to another aspect of the invention, a latch system is configured for remotely monitoring an engaged status or a disengaged status of a latch cam and a closed status or an opened status of a panel. The latch system includes an enclosure including the panel mounted for movement relative to a frame, the panel being movable between an opened position in which the panel is open relative to the frame and a closed position in which the panel is closed relative to the frame. A latch is mounted to the panel or to the frame of the enclosure with the latch cam of the latch moveable relative to the panel or to the frame between an engaged position and a disengaged position, the latch cam being configured to engage the panel relative to the frame in the engaged position when the panel is in the closed position, and the latch cam being configured to disengage the panel relative to the frame in the disengaged position to allow the panel to move to the opened position. A latch cam sensor is mounted to the other one of the panel or the frame, the latch cam sensor being configured to detect an engaged status of the latch cam when the latch cam is in the engaged position and the panel is in the closed position, and the latch cam sensor being configured to detect a disengaged status of the latch cam when the latch cam is in the disengaged position and the panel is in the opened position. The latch cam sensor is configured to generate a signal indicating the engaged status or the disengaged status of the latch cam and a signal indicating the closed position or the opened position of the panel, thereby providing an indication when the latch cam is disengaged but the panel is closed.

According to yet another aspect of the invention, a latch is configured for use with a latch sensor having a magnetic switch positioned to sense when a magnet moves within a predetermined distance of the latch sensor. The latch includes a latch cam moveable between an engaged position and a disengaged position; a sleeve mounted to the latch cam, the sleeve defining a plurality of receptacles each configured to receive at least one magnet; and at least one magnet configured to be carried by the sleeve. The at least one magnet is positionable within one of the receptacles of the sleeve, the receptacle being selected depending on the orientation of the latch cam relative to the latch sensor when the magnet of the latch cam moves within the predetermined distance of the latch sensor.

According to another aspect of the invention, a latch system is configured for remotely monitoring an engaged status or a disengaged status of a latch cam and a closed status or an opened status of a panel. The latch system includes an enclosure including the panel mounted for movement relative to a frame, the panel being movable between an opened position in which the panel is open relative to the frame and a closed position in which the panel is closed relative to the frame. The latch system also includes a latch mounted to the panel or to the frame of the enclosure with the latch cam of the latch moveable relative to the panel or to the frame between an engaged position and a disengaged position, the latch cam being configured to engage the panel relative to the frame in the engaged position when the panel is in the closed position, and the latch cam being configured to disengage the panel relative to the frame in the disengaged position to allow the panel to move to the opened position. A latch cam sensor is mounted to the other one of the panel or the frame, the latch cam sensor being configured to detect an engaged status of the latch cam when the latch cam is in the engaged position and the panel is in the closed position, and the latch cam sensor being configured to detect a disengaged status of the latch cam when the latch cam is in the disengaged position and the panel is in the opened position, the latch cam sensor being configured to generate a signal indicating the engaged status or the disengaged status of the latch cam. The latch cam sensor is a contact or contactless sensor configured to detect proximity of the latch cam.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF EMBODIMENTS OF THE INVENTION

Figure 1:
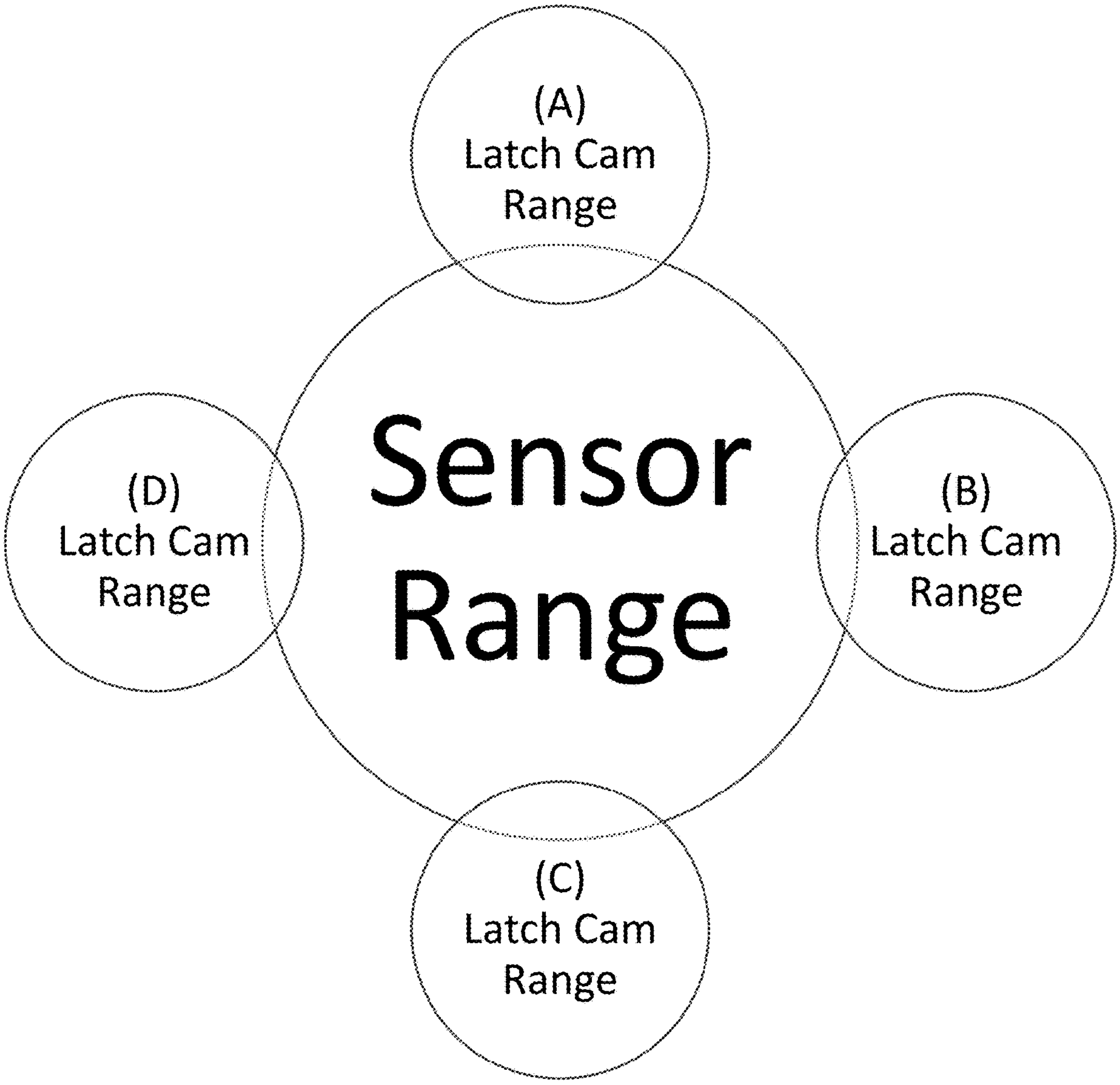
FIG. 1 schematically depicts a sensor having a range throughout which it is capable of sensing a latch in various mounting orientations.

Although the invention is illustrated and described herein with reference to specific embodiments, the invention is not intended to be limited to the details shown. Rather, various modifications may be made in the details within the scope and range of equivalents of the claims and without departing from the invention.

Disclosed are door sensor systems configured for monitoring the status of a panel, such as a door or drawer or other moving component of an assembly or enclosure, secured by mechanical or electromechanical latches. The systems can provide the status of the panel as well as the status of the latch securing the panel, thereby avoiding a false sense of security if the panel is sensed to be closed but the latch is not engaged.

Further, as the Industrial Internet of Things (IIoT) expands, there is a growing need to electronically monitor not only the status of panels and compartments on equipment or enclosures, but also the status of the mechanical lock or latch. Accordingly, systems disclosed herein can be used in IIoT applications or monitoring or auditing the status of enclosures and latches. Also, the systems disclosed herein provide a simple low cost solution that can be applied to both new and existing mechanical locks or latches. For example, new latch and sensor systems can embody aspects of this invention. Also, features of this invention can be used to retrofit existing or installed latches (e.g., by modifying the latch to include a magnet or other sense-able component, by adding a sensor for use with an existing latch, or by otherwise retrofitting an existing or already-installed latch). Accordingly, the exemplary latches and latch sensor systems described herein can provide for latch sensing and have at least one of improved performance, reduced cost, or ease of manufacture or assembly.

While particular latch embodiments are described herein, components of the disclosed embodiments may be incorporated into any conventional latches known to one of ordinary skill in the art to achieve the advantages described herein. For example, components of the disclosed embodiments may be incorporated into those latches described in U.S. Pat. No. 4,583,775, the contents of which are incorporated herein by reference in their entirety.

Likewise, the disclosed latches may be usable on any structure, including any type of storage compartments in which it is desirable to secure the contents of the compartment. The latch is preferably for use with a panel mounted to a frame. Such a latch is configured for movement from an open position in which a panel is not latched relative to the frame, to a latched position in which the panel is latched relative to the frame, and optionally to a locked position in which the panel is pulled against the frame such that they are compressed against one another.

As will be described in greater detail below, an optional indicator light is provided for internal and/or external illumination such as when the latch is open. For example, an optional externally visible indicator light can provide device status.

Also, this invention provides a system to connect with newly-installed or existing sensors to record and monitor the status of the latch and/or the door or enclosure to which it is attached.

As mentioned above and described in further detail below, this invention provides an indication or confirmation of the secure state (e.g., locked and latched) of a latch along with the secure state of the door or enclosure, in one system. It can be used with a variety of latching solutions including cam latches, compression latches, push-to-close latches, and other latch configurations. FIGS. 4A-4F depict various latch and pawl configurations that may be employed according to aspects of this invention. For example, the form of latch can include but is not limited to a cam latch such as the cam latch example depicted in FIG. 4A, a compression latch such as the compression latch example depicted in FIG. 4B, a compression latch with an adjusting screw pawl such as the latch example depicted in FIG. 4C, rotating cam latches such as the cam latch examples depicted in FIG. 4D, a lever compression latch with an adjusting screw pawl such as the latch example depicted in FIG. 4E, and a push-to-close latch such as the latch example depicted in FIG. 4F. Any latch having a body and a moving component such as a pawl or cam that moves relative to the body can be employed.

By incorporating an LED or other light source into the system, interior illumination of the structure can be provided when the latch is in the open state, providing additional functionality in one system.

Generally, the latch is preferably a latch for use with a panel mounted to a frame. Such a latch is configured for movement from a disengaged position in which a panel is not latched relative to the frame, to an engaged position in which the panel is latched relative to the frame.

Figure 2:
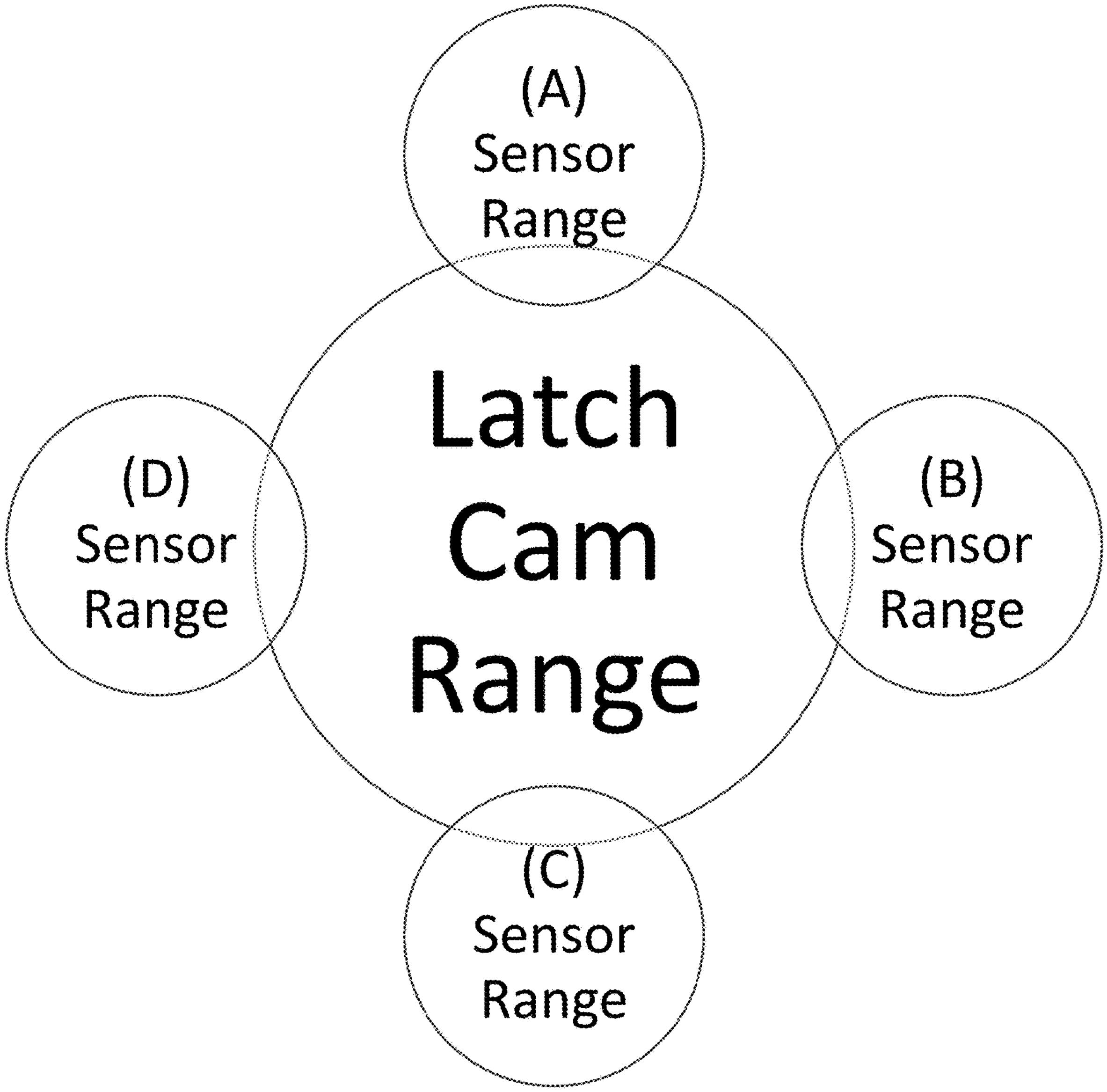
FIG. 2 schematically depicts a latch having a pawl, such as a latch cam, with a range of motion detectable by sensors in various mounting orientations.

Referring first to FIGS. 1 and 2, latch and sensor systems disclosed herein can be considered to be universal in that they accommodate and allow for many alternative orientations of latches and sensors, depending on the particular application for the system, the components to which the system will be attached, and the preference of the user of the system. The latches may be of any variety, size or type. They have a component or portion that moves relative to a body of the latch between engaging and disengaging positions. Although the moving component or portion by be referred to herein as a pawl, it is recognized that a pawl can be any moving component such as a latch cam or any other such component or portion.

FIG. 1 schematically depicts a sensor having a range throughout which it is capable of sensing a latch in various mounting orientations. The sensor range, depicted schematically in the center, can extend in a plane or generally spherically. A latch having a pawl (e.g., latch cam) range of motion can then be mounted in a variety of locations such as the four locations (A)-(D) schematically depicted in FIG. 1. It will be understood that many more than four locations can be selected in which the depicted latch cam range at least partially overlaps with the sensor range. Also, it will be understood that the locations of the latches can be in any plane surrounding a generally spherical sensor range (e.g., above and below the plane in which the sensor is mounted).

FIG. 2 schematically depicts a latch having a pawl, such as a latch cam, with a range of motion detectable by sensors in various mounting orientations. The latch cam range, depicted schematically in the center, can extend in a plane or generally spherically. A sensor having a sensor range can then be mounted in a variety of locations such as the four locations (A)-(D) schematically depicted in FIG. 2. It will be understood that many more than four locations can be selected in which the depicted sensor range at least partially overlaps with the latch cam range. Also, it will be understood that the locations of the sensors can be in any plane surrounding a generally spherical latch cam range (e.g., above and below the plane in which the latch is mounted).

Accordingly, if a particular application for the latch and sensor system requires or dictates a particular location for the sensor (e.g., the configuration in FIG. 1), then the latch and resulting pawl range of motion can be positioned in a variety of positions and orientations. Similarly, if a particular application for the latch and sensor system requires or dictates a particular location for the latch (e.g., the configuration in FIG. 2), then the sensor and resulting sensor range can be positioned in a variety of positions and orientations. In this way, the latch and sensor system provides a universal solution for various latches types and various applications.

Referring generally to the figures, and according to one aspect of the invention, a universal latch and sensor system 100 configured for use with an enclosure having a panel 102 and a frame 104 and for latching the panel 102 relative to the frame 104 is provided. The system 100 includes a latch 200 having a body configured to be mounted to the panel or to the frame of the enclosure. The latch 200 also has a pawl, such as latch cam 202, movable relative to the body throughout a range of motion including an engaging position (e.g., FIG. 7A) and a disengaging position (e.g., FIG. 7B). The system 100 also includes a sensor 310 having a body configured to be mounted to the other of the panel 102 or the frame 104 of the enclosure, the sensor 310 also having a sensing range (e.g. FIG. 1) throughout which it is capable of sensing the pawl 202 of the latch 200. The sensor 310 and the latch 200 are configured to be mounted in any of a plurality of orientations in which the range of motion of the pawl 202 of the latch 200 (e.g. FIG. 2) at least partially overlaps with the sensing range of the sensor 310 while maintaining a gap between the body of the sensor 310 and the pawl 202 of the latch 200 when the pawl 202 is in the engaging position. The sensor 310 is configured to sense the presence or absence of the pawl 202 of the latch 200 when the sensor 310 and the latch 200 are mounted in any of the orientations and when the pawl 202 of the latch 200 is moved in the range of motion of the pawl 202 to any location within the sensing range of the sensor 310.

The body 208 of the latch 200 can be configured to be mounted to the panel 102 of the enclosure, and the body of the sensor 310 can be configured to be mounted to the frame 104 of the enclosure. Also, the pawl 202 of the latch 200 can be movable relative to the body 208 along an arcuate path throughout the range of motion between the engaging position and the disengaging position. Also, the body of the sensor 310 is optionally configured to be mounted to a planar surface and the arcuate path along which the pawl 202 of the latch 200 is movable is optionally oriented along a plane substantially parallel to the planar surface. Alternatively, the arcuate path along which the pawl 202 of the latch 200 is movable can be oriented along a plane angled relative to the planar surface.

The sensing range of the sensor 310 throughout which it is capable of sensing the pawl 202 of the latch can be a generally spherical range extending in all directions from the sensor 310. The sensor 310 and the latch 200 can be configured to be mounted in any of a plurality of orientations in which the range of motion of the pawl 202 of the latch 200 at least partially overlaps with the generally spherical sensing range of the sensor 310. Also, the sensor 310 can be configured to sense the presence or absence of the pawl 202 of the latch 200 when the sensor 310 and the latch 200 are mounted in any of the orientations and when the pawl 202 of the latch 200 is moved in the range of motion of the pawl 202 to any location within the generally spherical sensing range of the sensor 310.

The body of the sensor 310 may have a facing surface, such as a top surface. The pawl 202 of the latch 200 in the engaging position is optionally spaced laterally from the facing surface of the body of the sensor. In this way, there is optionally a space or gap maintained between the moving component (e.g., a pawl, such as latch cam 202) of the latch 200 and the housing 318 in which the sensor is positioned. Accordingly, in addition to avoiding contact between the sensor 310 itself (e.g., a reed switch 302 as described below) and the sensed component of the latch 200 (e.g., a magnet 206), there is also an optional space or gap or distance separating the housing 318 of the sensor 310 from the latch 200, even when the latch 200 is in the engaging position.

According to another aspect of the invention, a latch system 100 is configured for remotely monitoring an engaged status or a disengaged status of a latch 200. The latch is configured to fix a panel 102 relative to a frame 104, such that the panel 102 and the frame 104 together form an enclosure. The panel 102 is configured for movement relative to the frame 104. Specifically, the panel 102 is movable between an opened position in which the panel 102 is open relative to the frame 104 and a closed position in which the panel 102 is closed relative to the frame 104.

Mounted to the one of the panel 102 or the frame 104 of the enclosure is the latch 200, which includes a latch cam 202. The latch cam 202 of the latch 200 is moveable relative to the panel 102 or to the frame 104 between an engaged position and a disengaged position. More specifically, the latch cam 202 is configured to engage the panel 102 relative to the frame 104 when the latch cam 202 is in the engaged position when the panel 102 is in the closed position. Further, the latch cam is configured to disengage the panel 102 relative to the frame 104 when the latch cam 202 is in the disengaged position to allow the panel 102 to move to the opened position.

Mounted to the other of the panel 102 or the frame 104 of the enclosure is a latch cam sensor 310. The latch cam sensor 310 is configured to detect an engaged or disengaged status of the latch cam 202. In one embodiment, the latch cam sensor 310 detects the engaged status of a latch cam 202 when the latch cam is in the engaged position and when the panel 102 is in the closed position. The latch cam sensor 310 can detect when the latch cam 202 is within a certain range of distance relative to the latch cam sensor 310. The latch cam sensor 310 is also configured to detect a disengaged status of the latch cam 202 when the latch cam 202 is in the disengaged position and the panel 102 is in the opened position.

Additionally, the latch cam sensor 310 is configured to generate a signal indicating the engaged status or the disengaged status of the latch 200. Specifically, the latch cam sensor 310 is configured to generate a signal indicating the engaged position or disengaged position of the latch cam 202. In yet another embodiment, the latch cam sensor 310 is configured to generate a signal indicating the closed position or the opened position of the panel 102. The latch cam sensor 310 is configured to generate a signal indicating the engaged position or the disengaged position of the latch cam 202 and a signal indicating the closed position or the opened position of the panel 102, thereby providing an indication of the engaged or disengaged status of the latch 200. The latch cam sensor 310 can include at least one of an electromagnetic sensor, a button, a camera, an ultrasound sensor, a capacitive sensor, a chemical sensor, a moisture sensor, a biological sensor, a temperature sensor, a pressure sensor and a radiation sensor.

Figure 6B:
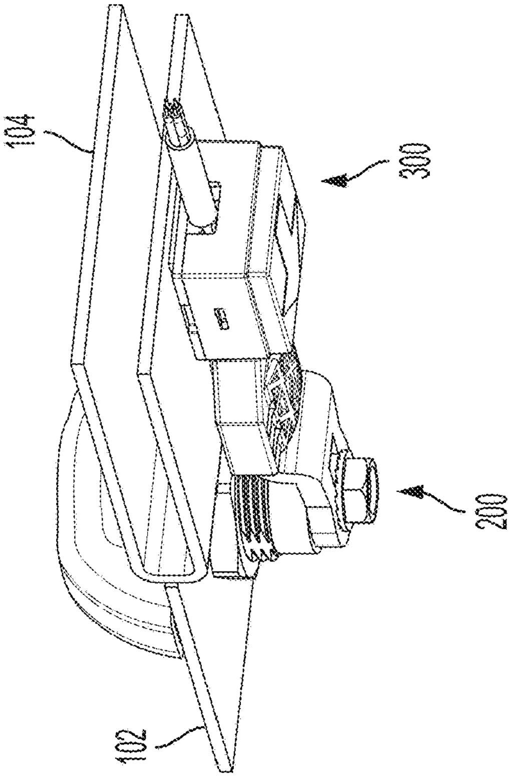
FIG. 6B depicts a bottom perspective view of an embodiment of a latch and sensor system, wherein a latch is mounted to a panel and a pawl sensor is mounted to a frame.
Figure 6A:
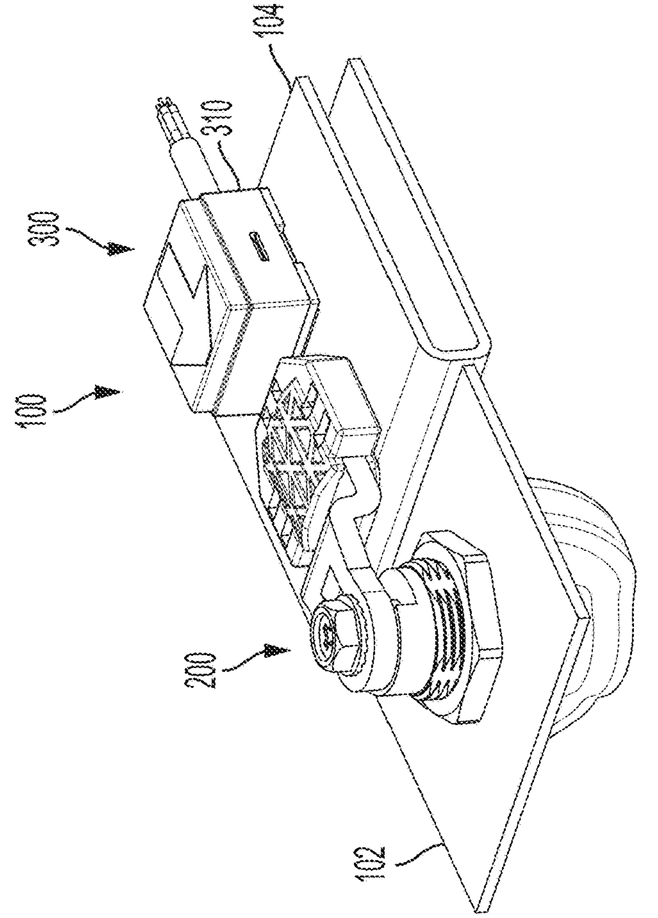
FIG. 6A depicts a top perspective view of an embodiment of a latch and sensor system, wherein a latch is mounted to a panel of an enclosure and a sensor is mounted to a frame of the enclosure.
Figure 6C:
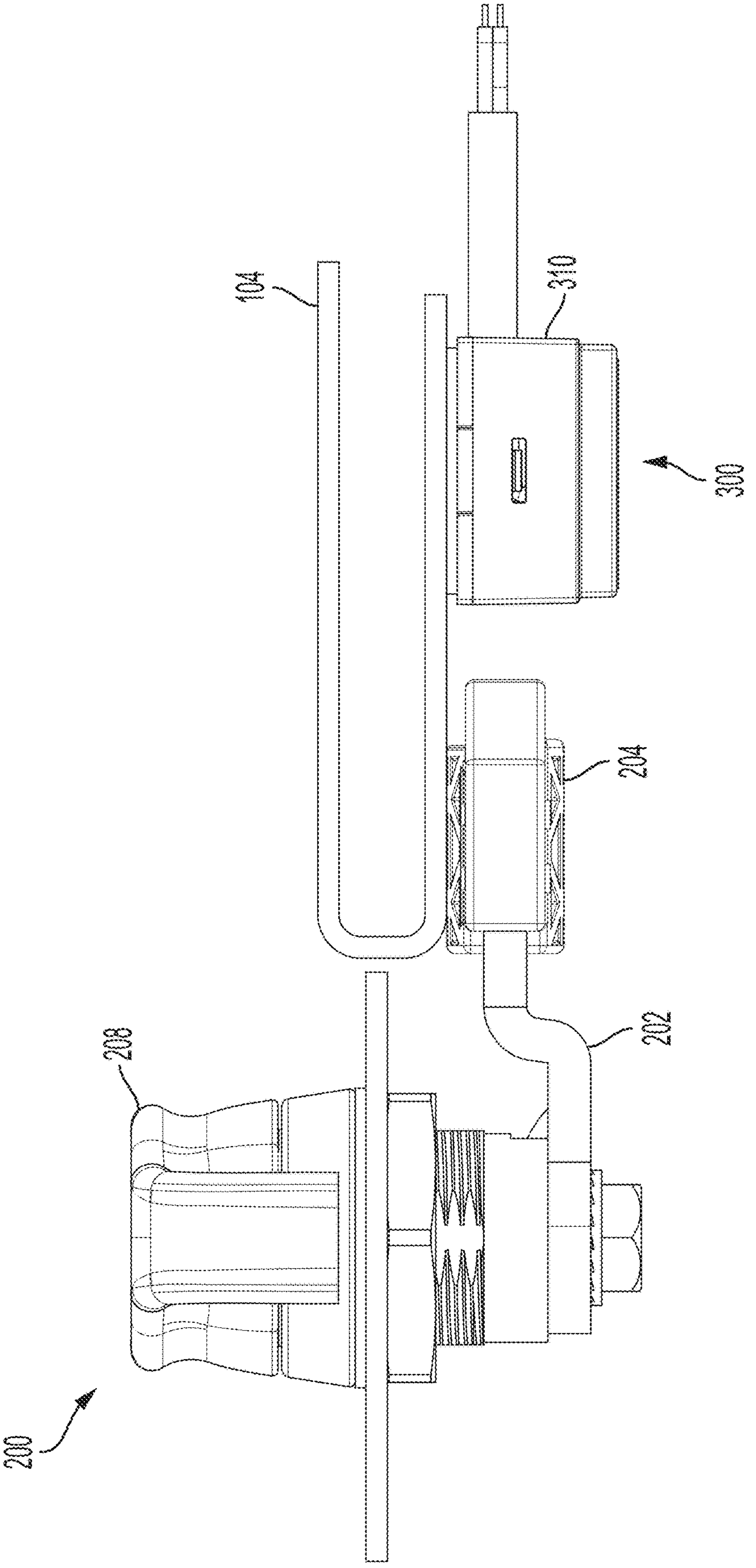
FIG. 6C depicts a side view of an embodiment of a latch system, wherein a latch is mounted to a panel and a pawl sensor is mounted to a frame.

Referring now to specific embodiments selected for illustration in the drawings, FIGS. 6A-6C illustrates a latch system 100 in accordance with aspects of the present invention. The latch system 100 comprises the latch 200 configured to fix the panel 102 and the frame 104, which together form the enclosure, and the latch cam sensor 310.

Figure 5A:
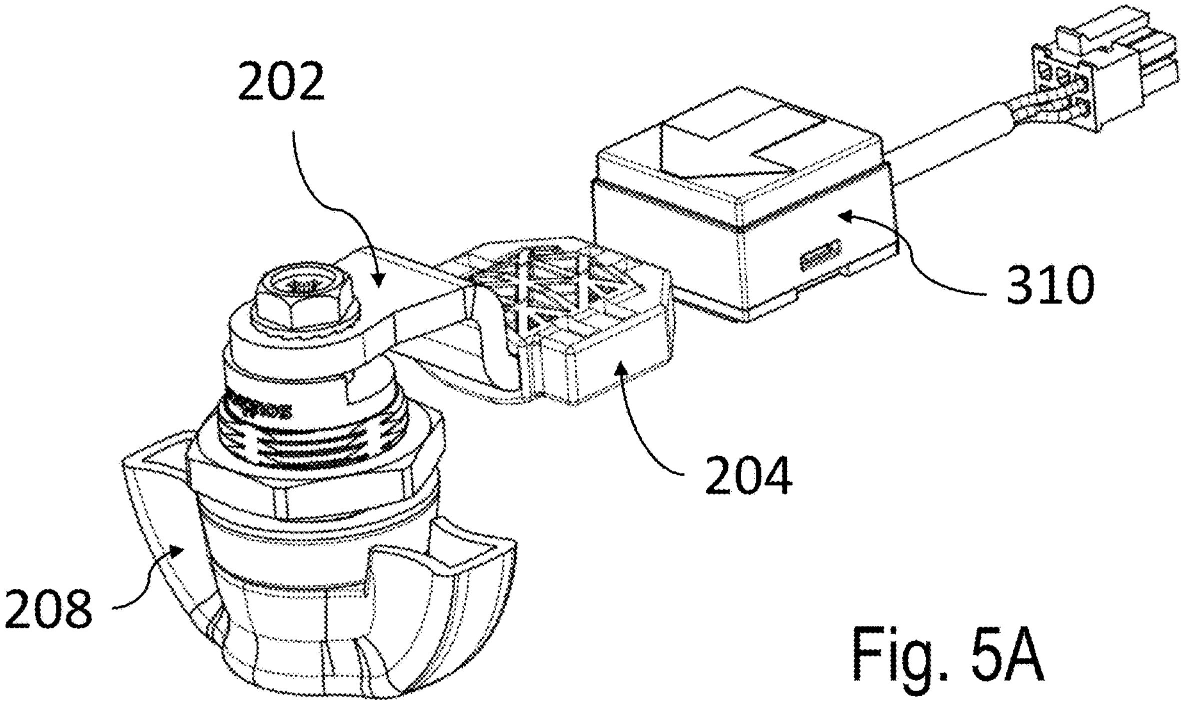
FIGS. 5A-5D depict perspective views of a latch and sensor system comprising a latch and a pawl sensor.
Figure 5B:
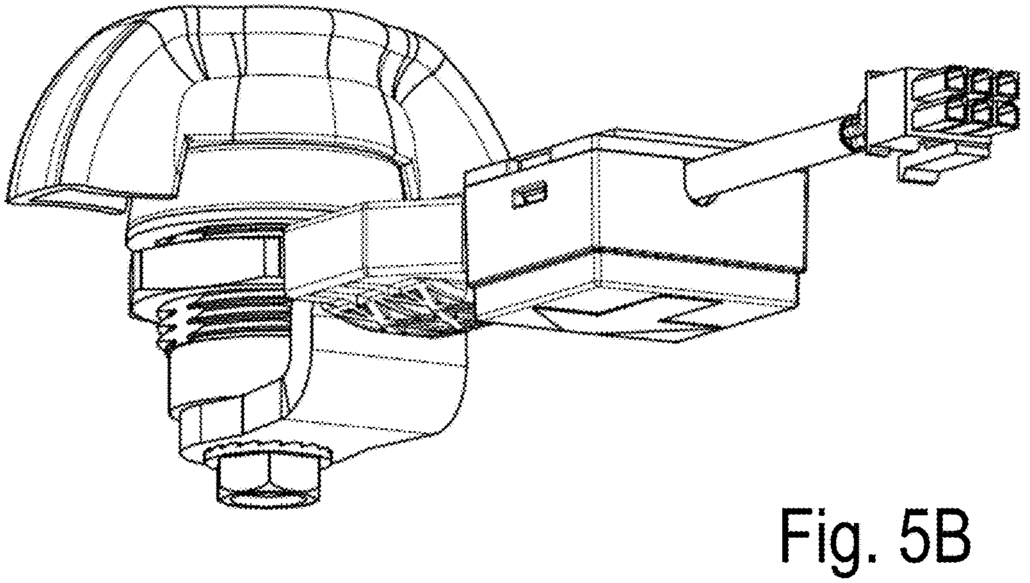
Figure 5C:
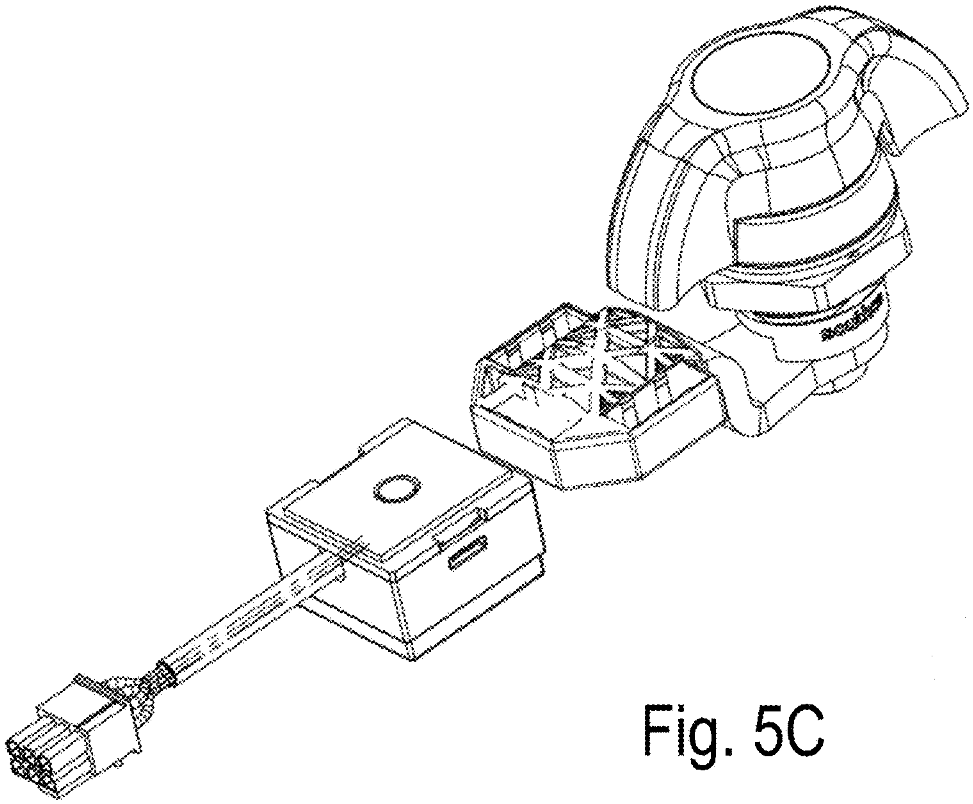
Figure 5D:
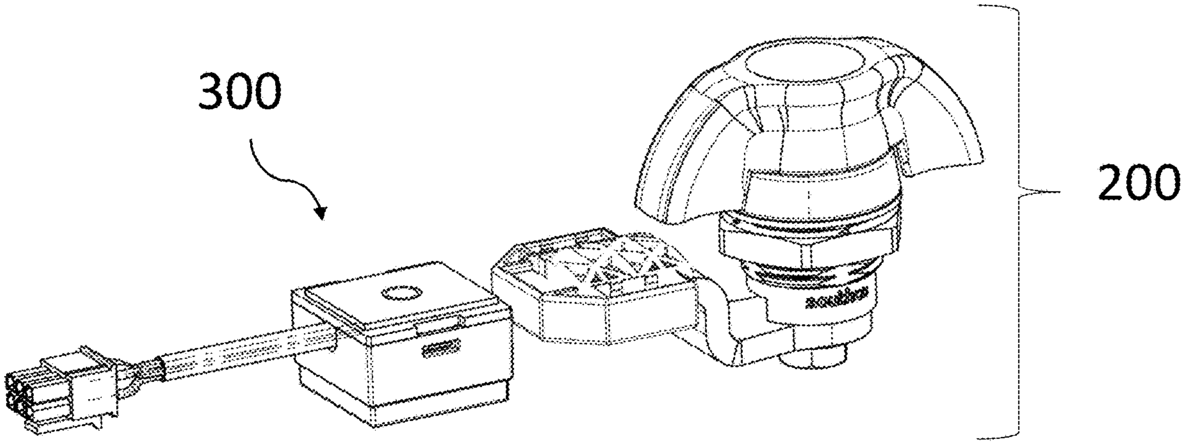

As seen in FIGS. 5A-5B, the latch 200 of the latch system 100 comprises at least latch cam 202, sleeve 204, and body 208, as well as a connector at the terminal end of the cable. The embodiment illustrated in FIGS. 5A-5B may include a single magnet positioned at or near the distal end of the sleeve 204. Additional details of the latch system 100 (FIGS. 6A-6C, 12A-12D), the latch 200 (FIGS. 7A-7B, 8A-8C, 19, 20, 21A-21E), and the latch cam sensor 310 (FIG. 10A-10D, 11, 13A-13H, 14A-14F, 15, 16, 17A-17B, 18A-18B) are described below.

As seen in FIG. 6A, the latch cam sensor 310 is mounted to a surface of the enclosure and the latch cam 202 of the latch 200 is configured to be movable generally within a plane 102 parallel to the surface. Alternatively or optionally, the latch cam 202 of the latch 200 is movable generally transverse to a plane parallel to the surface.

Additionally, the latch cam 202 of the latch 200 is moveable relative to the panel 102 or to the frame 104 and is configured to move within the predetermined distance D (FIG. 3) of the latch cam sensor 310. Correspondingly, the latch cam sensor 310 is configured to detect the latch cam 202 when the latch cam 202 is within a predetermined distance D (FIG. 3) of the latch cam sensor 310 in any direction (FIG. 2). The latch cam sensor 310 is also configured to generate a latch status signal for a user, when the latch cam 202 is detected to be within the predetermined distance D (FIG. 3) of the latch cam sensor 310. Additional details of latch cam sensor 310 are discussed below.

Figure 8A:
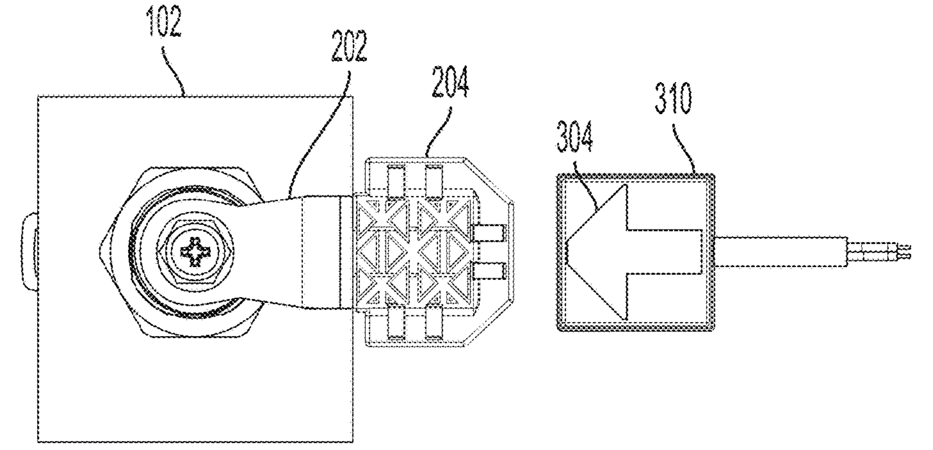
FIGS. 8A-8C depict views of a latch cam sensor positioned in various orientations to sense a magnet within a predetermined distance, the magnet being carried by a sleeve mounted to a pawl such as a latch cam.
Figure 8B:
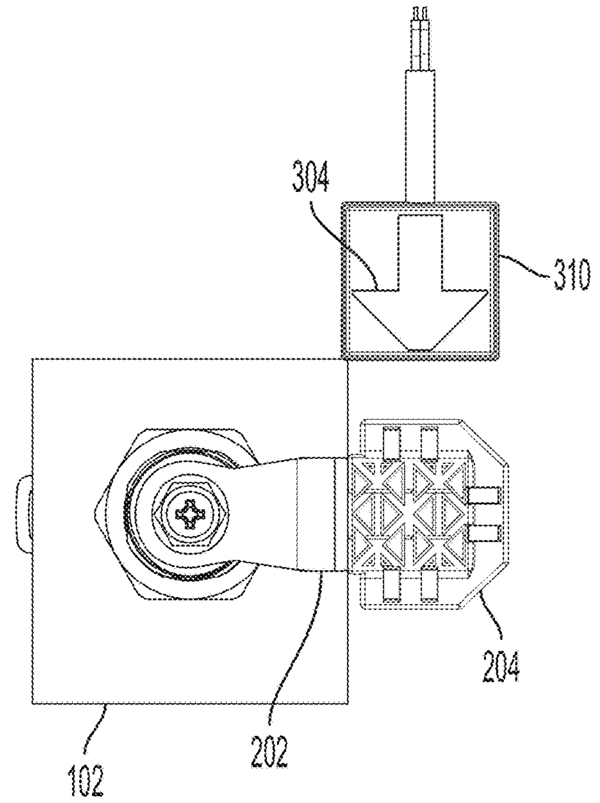
Figure 8C:
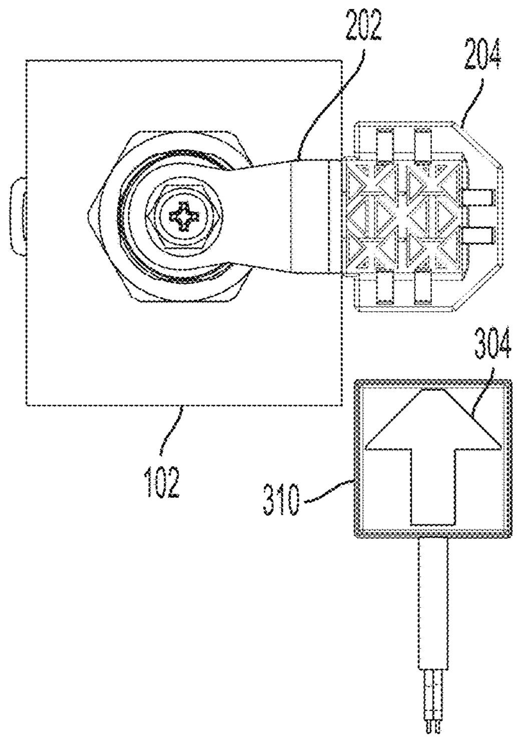
Figure 19:
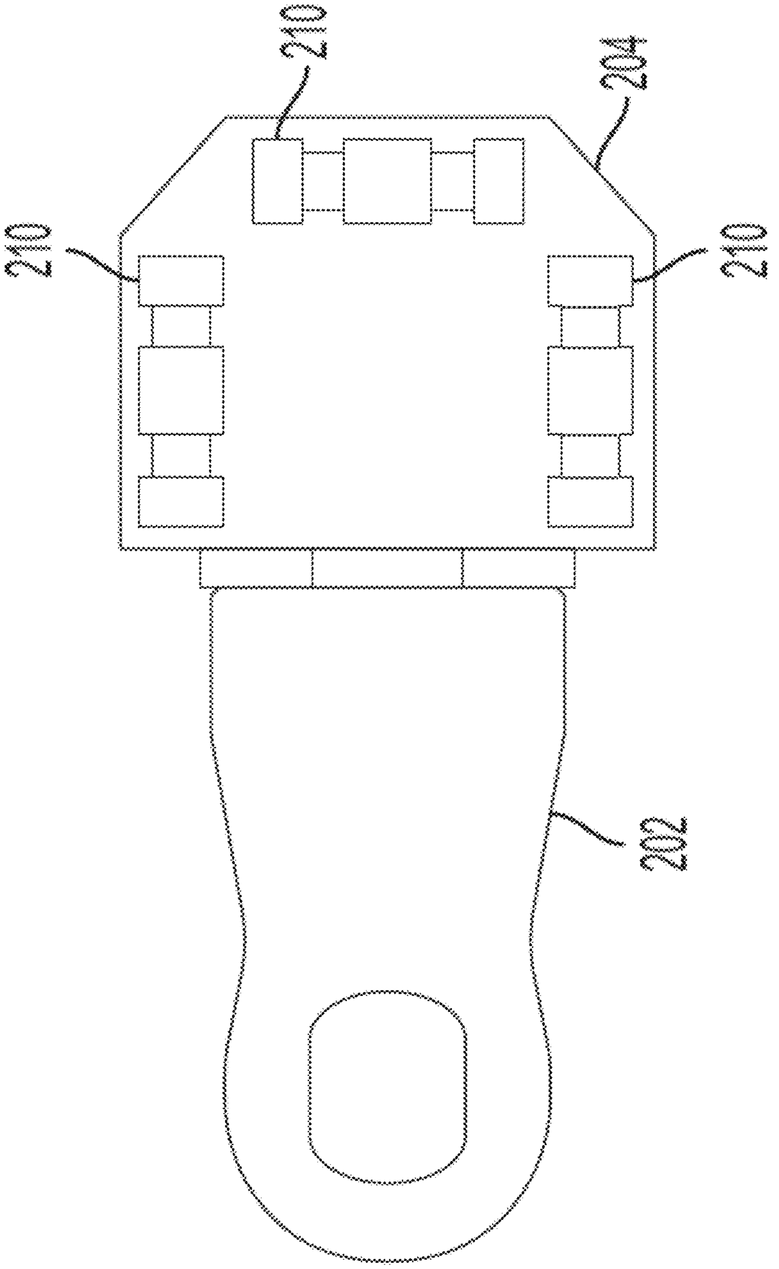
FIG. 19 depicts a view of a sleeve mounted on a pawl such as a latch cam, showing receptacles into which one or more magnets can be positioned.
Figure 20:
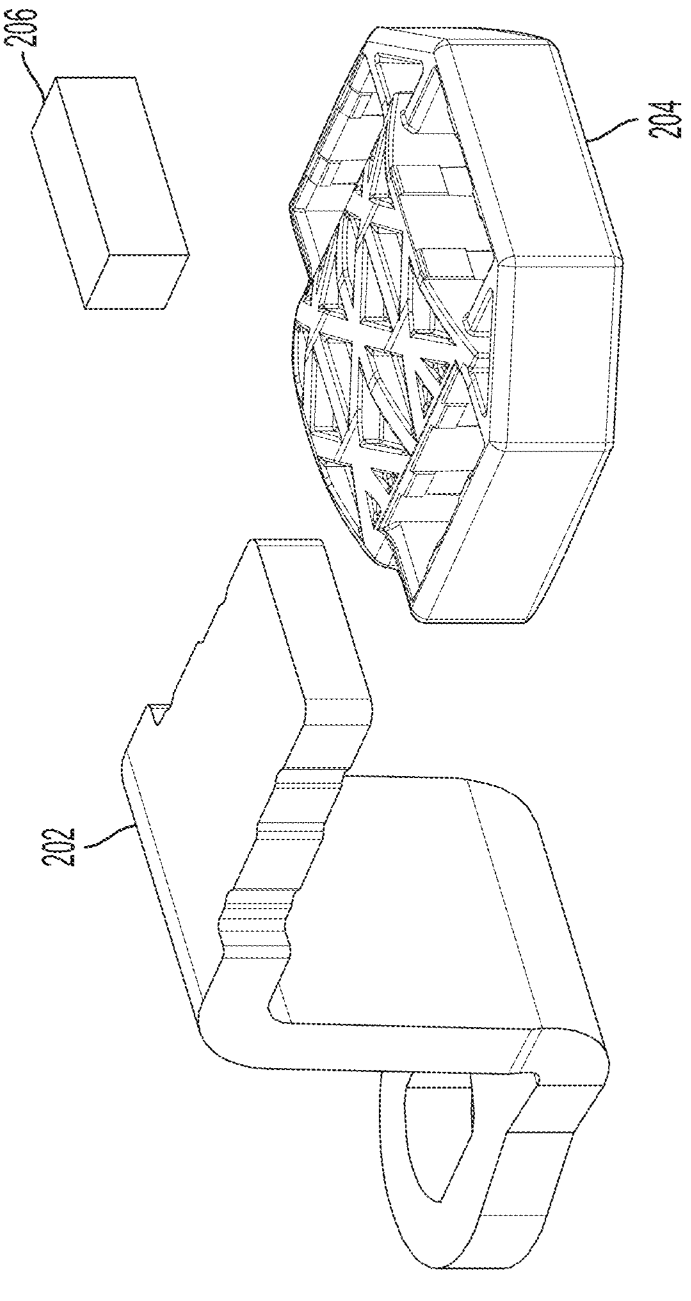
FIG. 20 depicts an exploded view of FIG. 19.
Figure 21A:
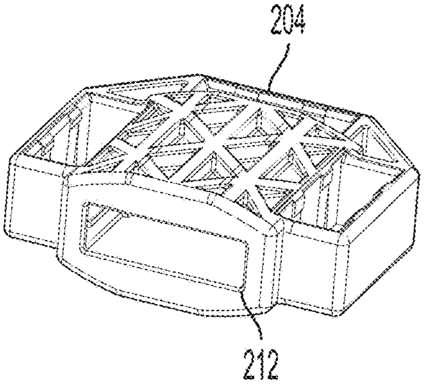
FIG. 21A depicts a perspective view of a sleeve.
Figure 21B:
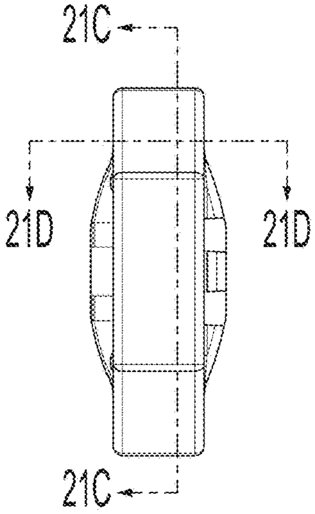
FIG. 21B depicts a front end view of the sleeve of FIG. 21A.
Figure 21C:
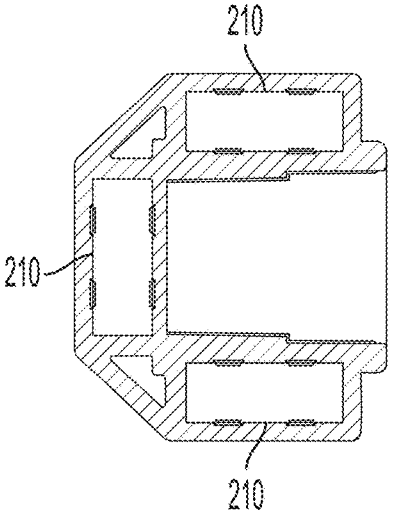
FIG. 21C depicts a cross-sectional top view of the sleeve of FIG. 21B, taken through line 21C-21C.
Figure 21D:
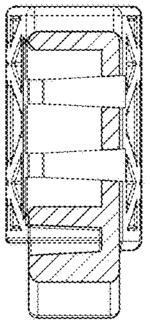
FIG. 21D depicts a cross-sectional side view of the sleeve of FIG. 21B, taken through line 21D-21D.
Figure 21E:
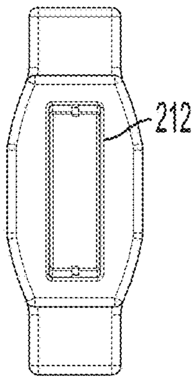
FIG. 21E depicts a rear end view of the sleeve of FIG. 21A.

As seen in FIG. 19, the latch cam 202 comprises a sleeve 204 mounted to the latch cam 202, wherein a magnet 206 is configured to be secured within the sleeve 204. In one embodiment, the magnet 206 is a N52 neodymium magnet with dimensions of 3⁄16 inches×3⁄16 inches×½ inches. However, it would be understood by one skilled in the art that the type and size of the magnet 206 may vary in accordance with the type of sleeve 204 and latch cam 202 configurations (as depicted by at least FIGS. 4 and 6C) as well as the type of sensor used in accordance with the present invention. As illustrated in FIG. 8A-8C, the magnet 206 may be secured within one of the plurality of receptacles 210 (FIG. 19), each configured to receive at least one magnet.

Figure 7B:
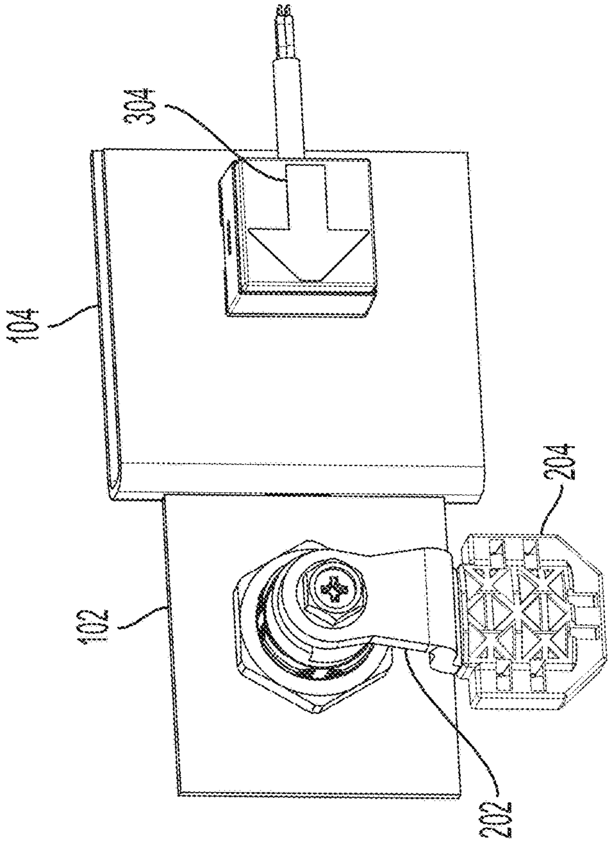
FIG. 7B depicts a perspective view of an embodiment of a latch system, sensor system, wherein a latch cam is in a disengaged position.
Figure 7A:
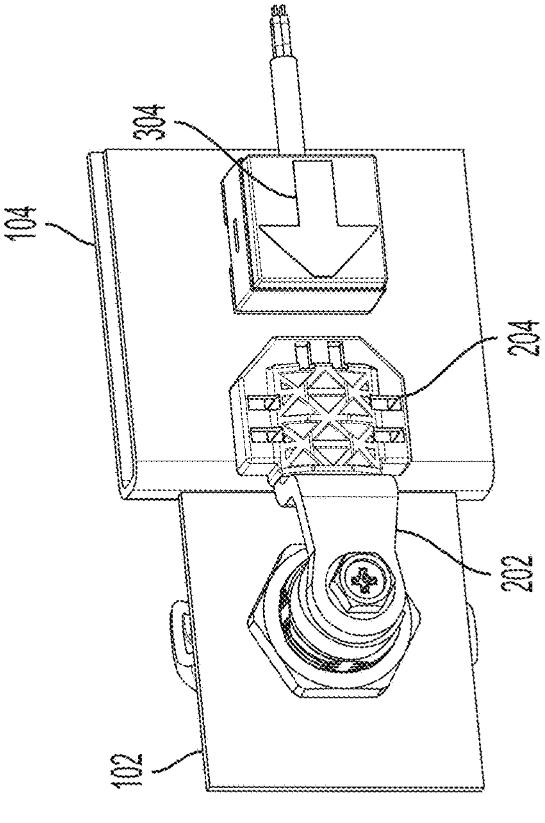
FIG. 7A depicts a perspective view of an embodiment of a latch and sensor system, wherein a pawl, such as a latch cam, is in an engaged position.

Referring now to FIGS. 21A-21E, the sleeve 204 defines an aperture 212 configured to receive the latch cam 202, such that the sleeve 204 surrounds a portion of the latch cam 202. The sleeve 204 defines at least three openings, such as receptacles 210, each configured to receive at least one magnet 206. The magnet 206 is positionable within one of the receptacles 210 based on the orientation of the latch cam 202 relative to the latch sensor 310, when the magnet 206 of the latch cam 202 moves within the predetermined distance D (FIG. 3) of the latch cam sensor 310. In other words, the latch cam 202 is configured for use with the latch cam sensor 310 when a reed switch assembly 302 of the latch cam sensor 310 is positioned to detect when the magnet 206 of the latch cam 202 moves within the predetermined distance D (FIG. 3) of the latch cam sensor 310. As seen in FIG. 7A, the latch cam sensor 310 is positioned to detect the engaged status of the latch 200 when the latch cam 202 moves to the engaged position and within the predetermined distance D (FIG. 3) of the latch cam sensor 310. Conversely, and as depicted in FIG. 7B, the latch cam 202 is positioned to detect the disengaged status of the latch 200 when the latch cam 202 moves to the disengaged position and within the predetermined distance D (FIG. 3) of the latch cam sensor 310.

In one embodiment, the magnet 206 is positionable in accordance with a directional indicator 304 of the latch cam sensor 310, generally corresponding to a position of the magnet 206 in the one of the plurality of receptacles 210. For example and as illustrated in FIG. 8A, the magnet 206 is secured in a receptacle 210 generally in line with the directional indicator 304 of the latch cam sensor 310. According to FIG. 8B, the magnet 206 is secured in a receptacle 210 generally below the directional indicator 304 of latch cam sensor 310 when the latch cam 202 is in the engaged position. As seen in FIG. 8C, the magnet 206 is secured in a receptacle 210 generally above the directional indicator 304 of the latch cam sensor 310 when the latch cam 202 is in the engaged position.

Figure 3:
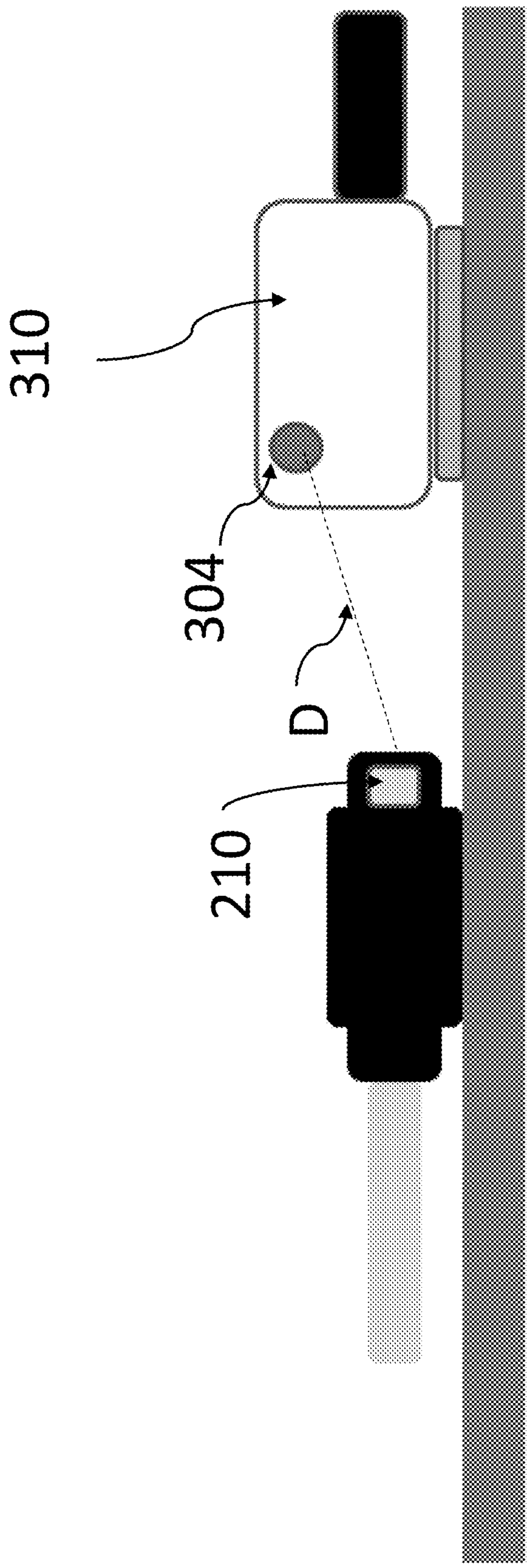
FIG. 3 schematically depicts a view of a predetermined distance D between a sensed component, such as a magnet secured in a sleeve of a latch cam, and a sensor, such as a reed switch assembly, according to an embodiment of the invention.
Figure 4A:
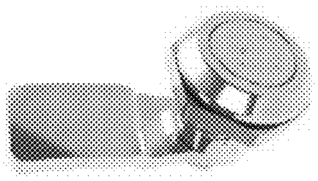
FIGS. 4A-4F depict various latch and pawl configurations that may be employed according to aspects of this invention.
Figure 4B:
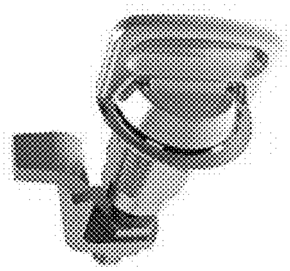
Figure 4C:
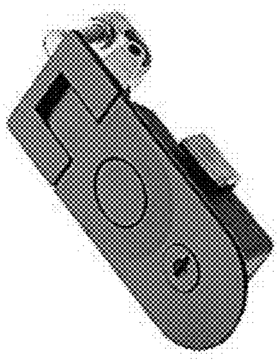
Figure 4D:
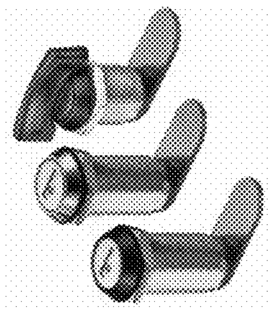
Figure 4E:
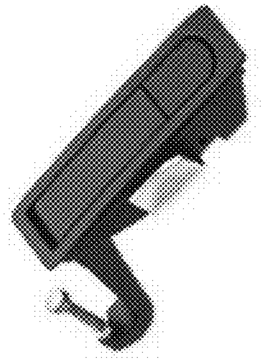
Figure 4F:
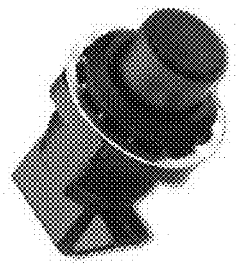

With the magnet 206 secured within the sleeve 202 mounted to the latch cam 202, the latch cam 202 generates a magnetic field. Correspondingly, the latch cam sensor 310 is configured to detect when the magnet 206 of the latch cam 202 enters the sensor range from any direction. In particular, the latch sensor 310 comprises a reed switch assembly 302 positioned to sense the magnet 206 when the sleeve 204 of the latch cam 202 moves within the predetermined distance D (FIG. 3) of the latch cam sensor 310. As depicted in FIGS. 1 and 2, the predetermined distance D (FIG. 3) is based on the overlap between the magnetic field sensing range established by the position of the reed switch assembly 302 in the latch cam sensor 303 and the position of the magnet 206 in the latch cam 202. As illustrated in FIG. 3, the latch cam 202 and the latch cam sensor 310 are positionable, such that the magnet 206 is proximal to the reed switch assembly 302, at a reading range, or detection distance D (FIG. 3) between 0 to 7 mm and more preferably at 5 mm. The reed switch assembly 302 is configured for detecting a change in magnetic field when the magnet 206 of the latch cam 202 moves within the predetermined distance D (FIG. 3) of the latch cam sensor 310.

Generally, when the panel 102 is in a closed position and the latch is closed, the reed switch assembly 302 of the latch cam sensor 310 and the magnet 206 of the latch cam 202 are in close proximity to each other, such that the reed switch assembly 302 senses the magnetic field generated by the magnet 206, causing the reed switch assembly 302 to normally be in an open or closed status. When the latch is disengaged and the panel 102 is open, the magnet 206 of the latch cam 202 and the reed switch assembly 302 of the latch cam sensor 310 move away from one other, such that the magnetic field sensed by the reed switch assembly 302 is reduced or eliminated. Consequently, the status of the reed switch assembly 302 changes, for example from open to closed or from closed to open (FIG. 17).

Figure 17B:
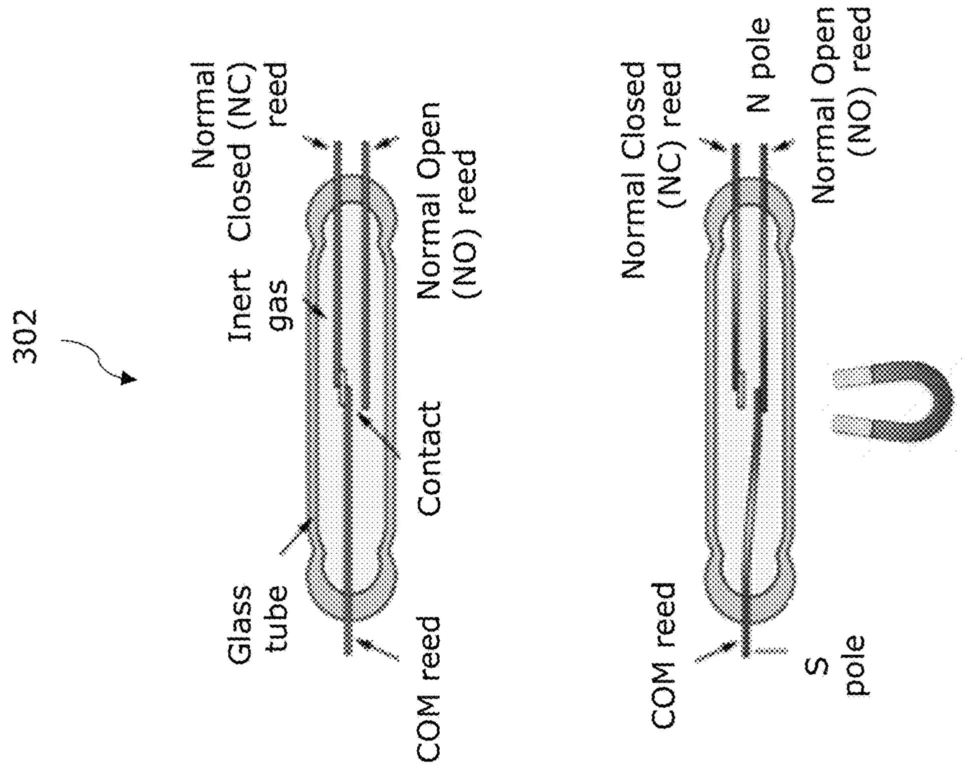
FIGS. 17A and 17B depict a diagram showing the functionality of a circuit board coupled to a light source.
Figure 17A:
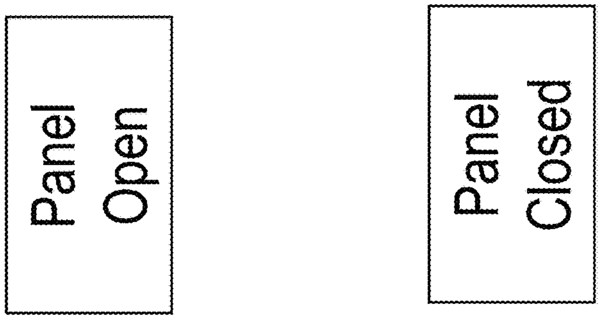
Figure 17A:
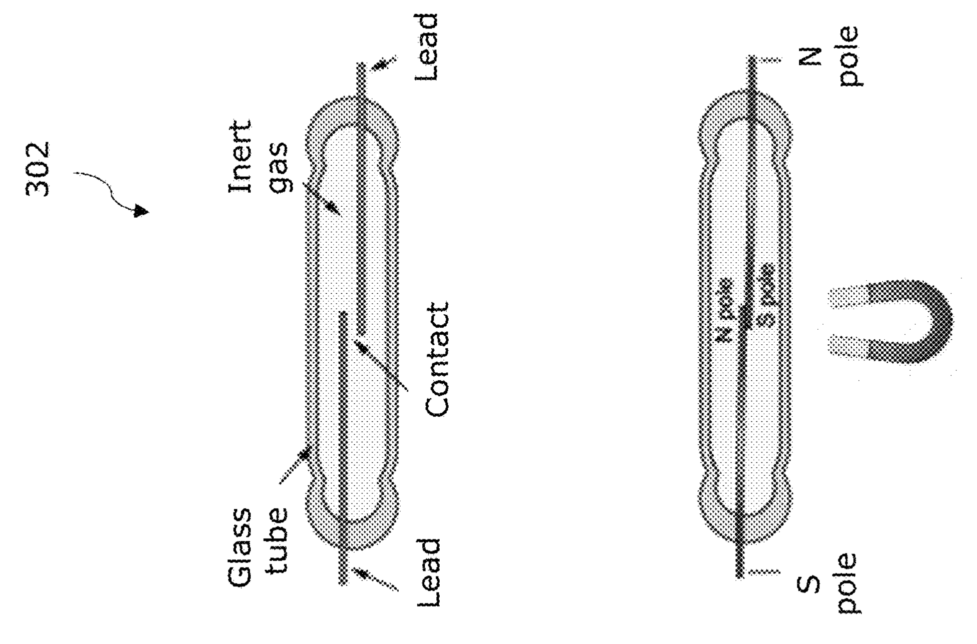
Figure 18A:
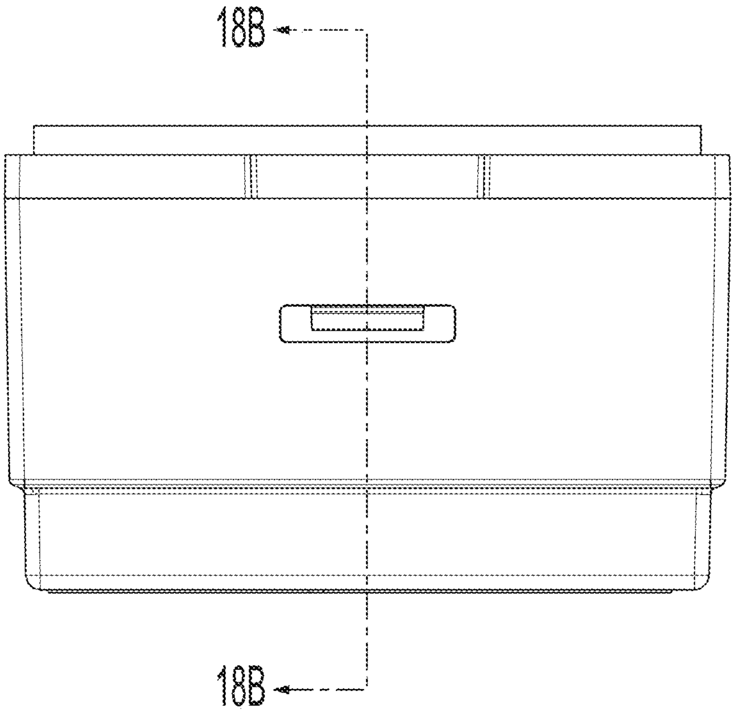
FIG. 18A depicts a side view of an embodiment of an assembled sensor.
Figure 18B:
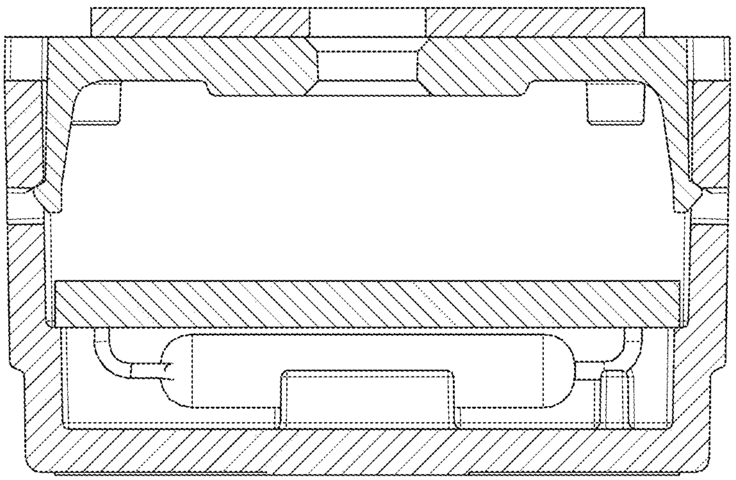
FIG. 18B depicts a cross-section view of the sensor shown in FIG. 18A, taken through line 18B-18B.

As depicted in the schematic of FIG. 17, the status change (from open to closed or vice versa) may be detected by electronic circuitry, such as a circuit board 306 (FIG. 15) coupled with the reed switch assembly 302. The circuit board 306 may then be configured to activate a light source 308, the light source 308 illuminating an interior portion of the enclosure. Additionally or optionally, the circuit board 306 may be configured to transmit a signal to a controller (not shown) located remotely from the enclosure. The signal may indicate that a status change of the reed switch assembly 302 of the latch cam sensor 310 has occurred, which in turn causes the controller (not shown) to perform a plurality of actions, including providing a visual indication of an engaged status or a disengaged status of a latch 200.

For example, when the panel 102 is in the opened position, the reed switch assembly 302 detects a reduction or elimination of a magnetic field produced by the magnet 206 as it moves away from the reed switch assembly 302 when the panel 102 is opened. In response, the reed switch assembly 302 transmits a signal to the controller (not shown) and the signal is indicative of the status of the panel 102 in the opened position and additionally, that the latch 200 is in the disengaged status. Correspondingly, when the panel 102 is in the closed position, the reed switch assembly 302 detects the presence of a magnetic field produced by the magnet 206 as it moves toward the reed switch assembly 302 when the panel 102 is closed. In response, the reed switch assembly 302 transmits a signal to a controller (not shown) and the signal is indicative of the status of the panel 102 in the closed position and additionally or optionally, that the latch 200 is in the engaged status.

Such position sensing of the latch cam 202 by the latch cam sensor 310 can be accomplished by a single switch such as a single pole, double throw (SPDT) reed switch assembly 302 or a single pole, single throw (SPST) reed switch assembly 302. In other words, the position sensing is optionally accomplished with a single sensor 310 as opposed to using plural switches or sensors; for example, a single switch or sensor is optionally used to accomplish plural tasks, such as for latch position sensing and initiating a response, such as activation of light sources 308.

Figure 9A:
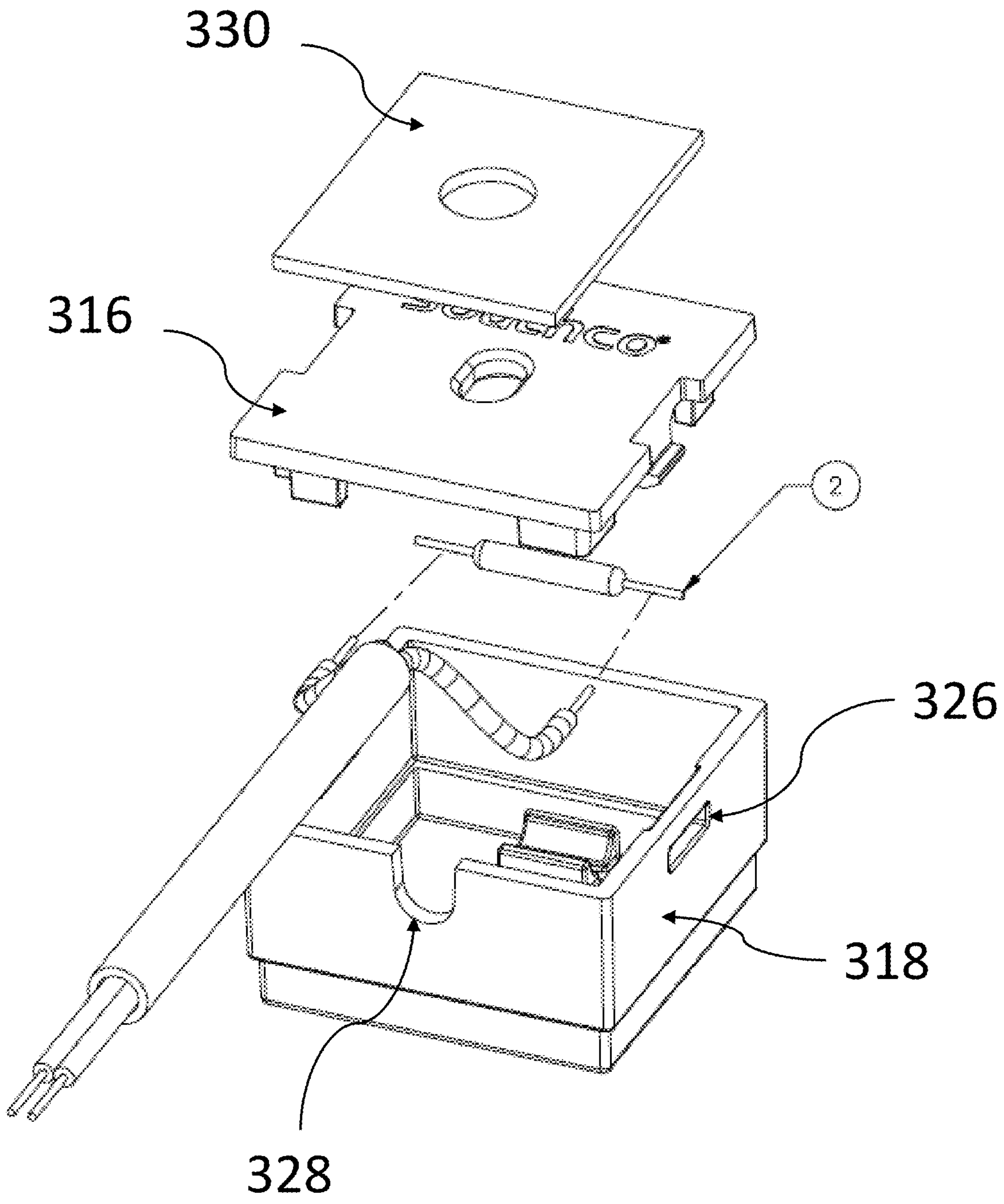
FIG. 9A depicts an exploded view of a latch sensor comprising at least a single pole, single throw electrical switch.

In one embodiment, the latch cam sensor 310 includes the reed switch assembly 302, such as a single pole, single throw switch. As seen in FIG. 9A, the single pole, single throw switch 302 is housed within the sensor housing 312. Further, the single pole, single throw switch 302 is in a normally open state (FIG. 17A). The presence of a magnetic field generated by the magnet 206 as it moves within predetermined distance D of the latch cam sensor 310 changes the status of the single pole, single throw switch 302 from a normally open position to a normally closed position. The change in the status of the single pole, single throw switch 302 is indicated as a change in voltage, as detected by wires (FIG. 11) in communication with a controller (not shown).

Figure 9B:
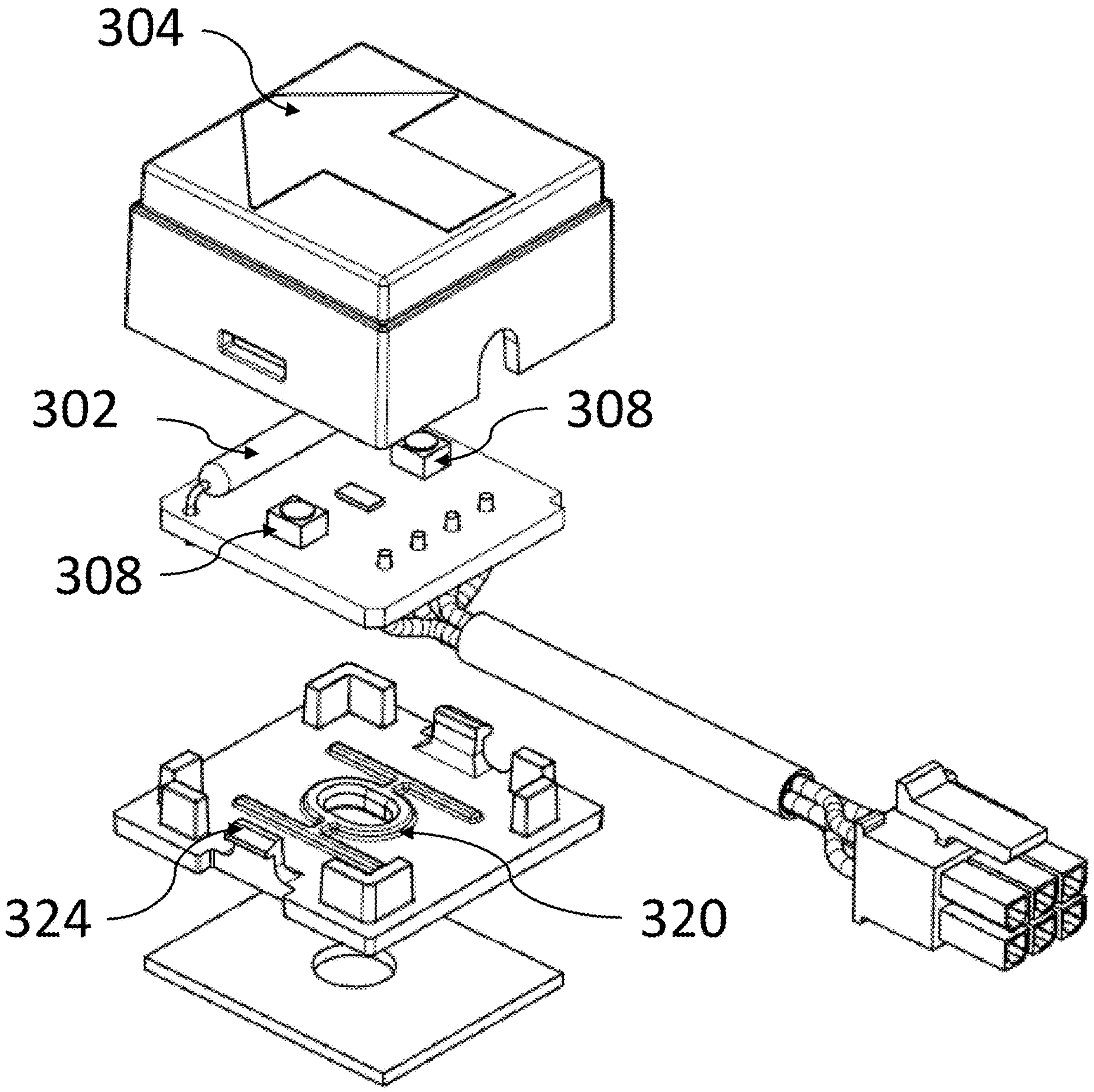
FIG. 9B depicts an exploded view of a latch sensor comprising at least a single pole, double throw electrical switch.
Figure 10B:
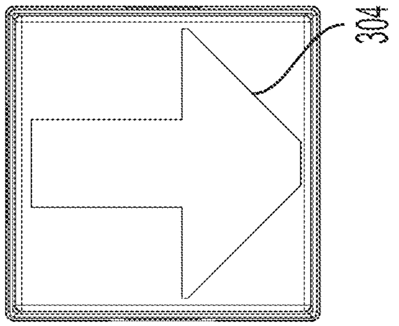
FIG. 10B depicts a top view of a sensor housing.
Figure 10D:
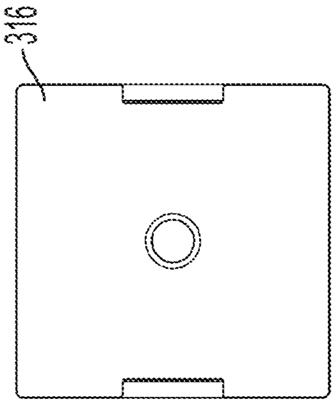
FIG. 10D depicts a bottom view of a sensor housing.
Figure 10A:
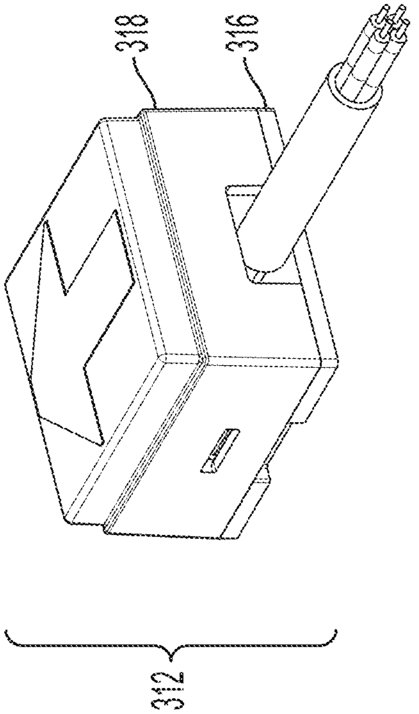
FIG. 10A depicts a perspective view of a sensor housing.
Figure 10C:
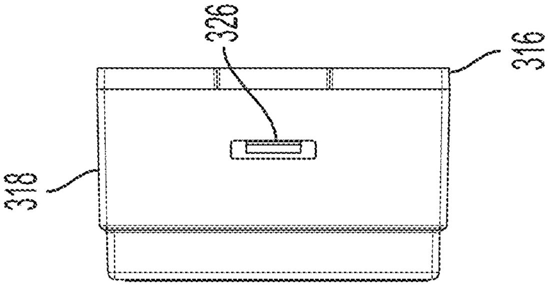
FIG. 10C depicts a side view of a sensor housing.
Figure 16:
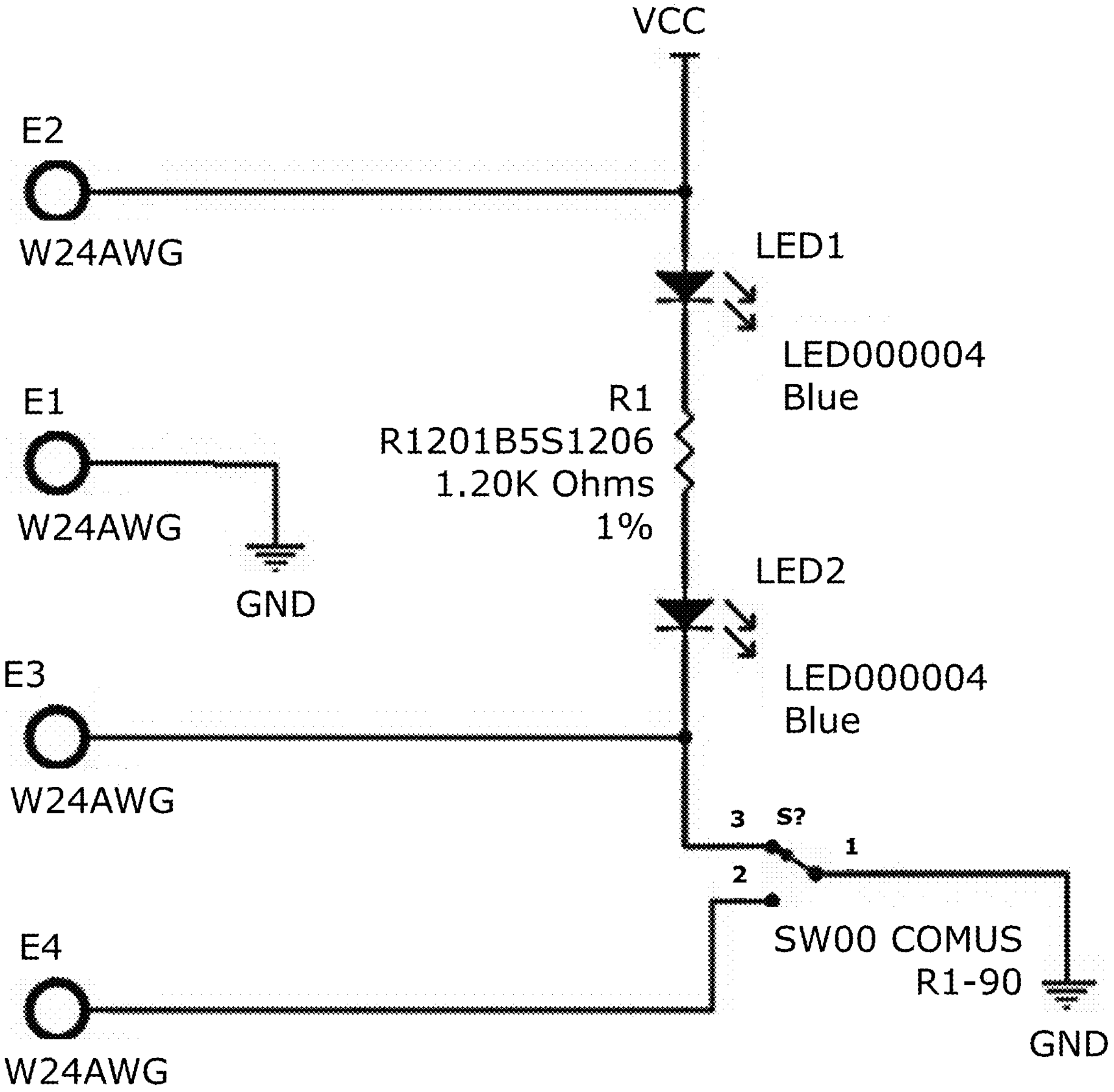
FIG. 16 depicts a schematic describing the operation of an electrical switch by a magnetic field.

In another embodiment, the latch cam sensor 310 includes the reed switch assembly 302, with a single pole, double throw switch. As seen in FIG. 9B, the single pole, double throw switch 302 is housed within the sensor housing 312 and is coupled to the circuit board 306. Further, the single pole, double throw switch 302 comprises a switch in a normally open and a switch in a normally closed state (FIG. 17B). The presence of a magnetic field generated by the magnet 206 as it moves within predetermined distance D of the latch cam sensor 310 changes the status of the single pole, double throw switch 302 from a normally open position to a normally closed position and vice versa. As depicted in the schematic of FIG. 16, the change(s) in the status(es) of the single pole, double throw switch 302 is/are indicated as change(s) in voltage (e.g. E2, E1, E3, and E4 in FIG. 16), as detected by wires (FIG. 11) in communication with a controller (not shown).

Figure 15:
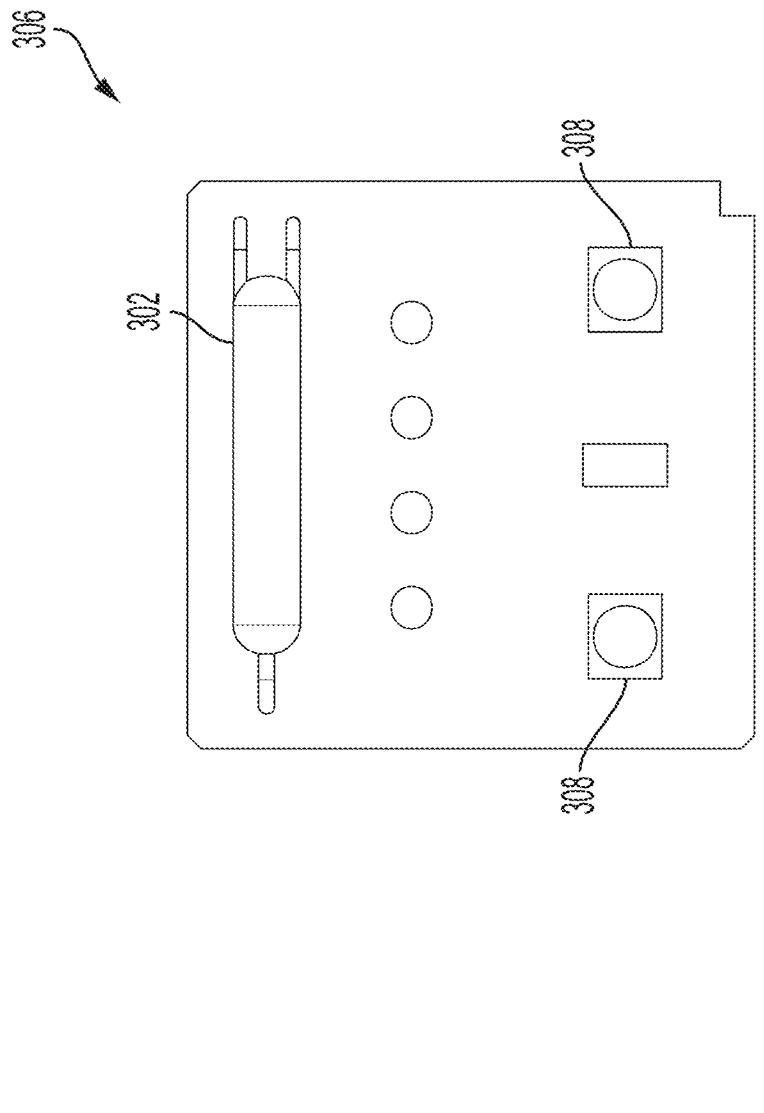
FIG. 15 depicts a sensor circuit board having at least one light source.

Referring now to FIG. 15, the sensor circuit 306 is coupled to the light source 308, such as light emitting diodes (LEDs). The sensor circuit 306 is coupled to a plurality of light sources 308. The circuitry 306 is also coupled to a power supply (not shown) and a ground (not shown), both configured to operate to allow selective illumination via the light sources 308 (e.g. LED1, LED2 in FIG. 16), as triggered by the detected change(s) in voltages (e.g. E2, E1, E3, and E4 in FIG. 16). Additionally, the light source 308 may be oriented toward the interior of the enclosure, thereby illuminating the interior of the enclosure. Alternatively or additionally, the light source 308 may be oriented outwardly relative to the interior of the enclosure, thereby being visible from outside of the enclosure.

Figure 12A:
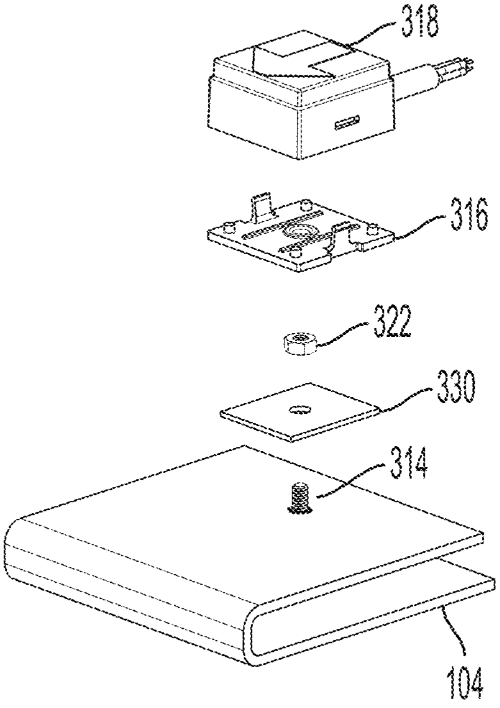
FIGS. 12A-12D depicts views corresponding to steps of assembling a latch system comprising a latch cam sensor attached to a frame.
Figure 12B:
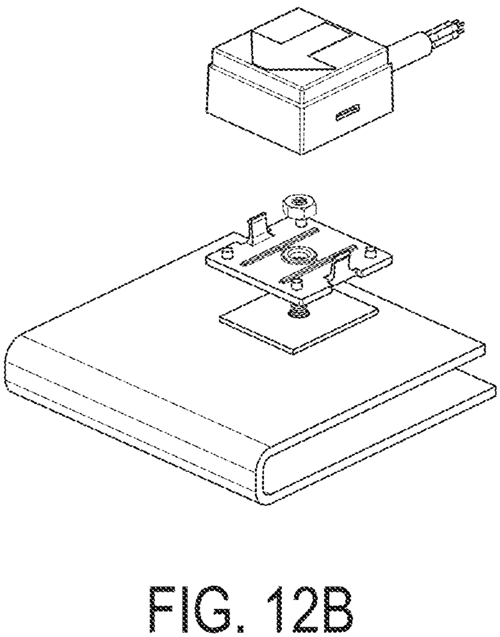
Figure 12C:
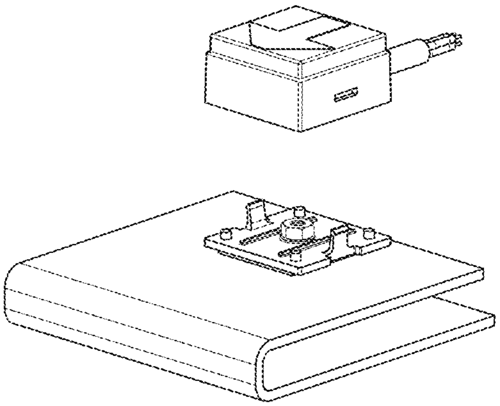
Figure 12D:
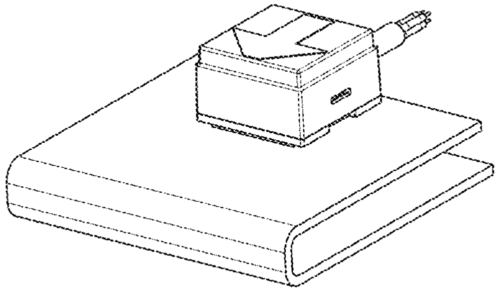

In accordance with another aspect of the invention, a sensor system 300 is configured to indicate the engaged status of the latch 200 during which access to an interior of the enclosure is restricted. The sensor system 300 comprises a latch cam sensor 310 having a sensor housing 312 configured to be mounted to the panel 102 or the frame 104 of the enclosure. Referring now to FIGS. 12A-12D, the sensor housing 312 is mounted to the enclosure via a mounting tape, such as a pressure sensitive adhesive 330. In this aspect of the invention, all components of the sensor housing 312 can optionally be assembled along one direction, such as a top down direction. In one assembly procedure, a mounting screw, such as a press-in stud 314, is installed on the panel 102 or the frame 104 (as seen in FIG. 12A). A pressure sensitive adhesive 330 is optionally attached to a back plate 316 prior to attaching the top portion 318 of the sensor housing 312, in which a circuit board 306 is already potted. Further, a screw, such as for example an M3 or 4-40 screw, may optionally be installed in a mounting hole 320 of the back plate 316. A truss, round, or pan head screw is used. As seen in FIGS. 12B-12C, the back plate 316 is attached to the panel 102 or the frame 104 and pressure is applied to activate the adhesive 330. A nut, such as MR nut 322, configured to be positioned within the sensor housing 312 and engaged with the press-in stud 314, is then attached and tightened to secure the back plate 316 in place. Finally and as shown in FIG. 12D, the top portion 318 of the sensor housing 312 is mounted in place via engagement of the snap legs 324 of the back plate 316 with the plurality of apertures 326 in the top portion 318 of the sensor housing 312.

Figure 13A:
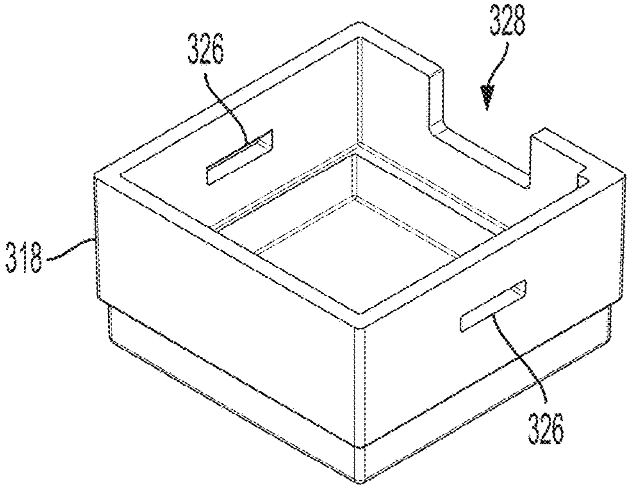
FIG. 13A depicts a perspective view of a top component of a sensor housing.
Figure 13B:
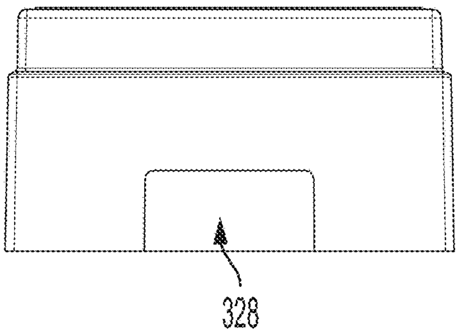
FIG. 13B depicts a side view of the sensor housing component shown in FIG. 13A.
Figure 13C:
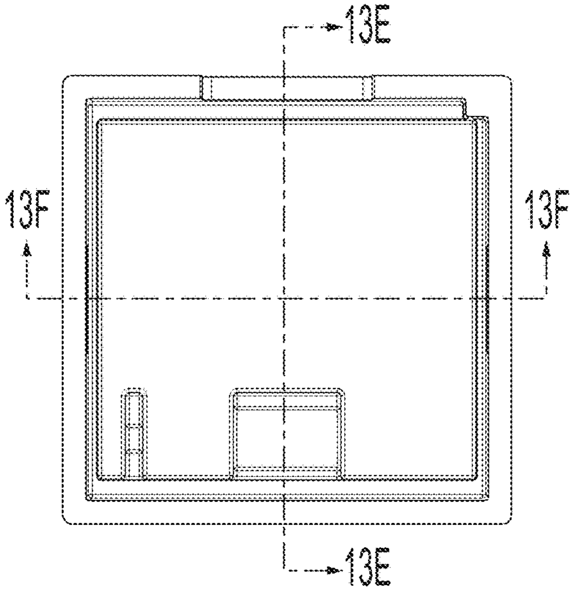
FIG. 13C depicts a bottom view of the sensor housing component shown in FIG. 13A.
Figure 13D:
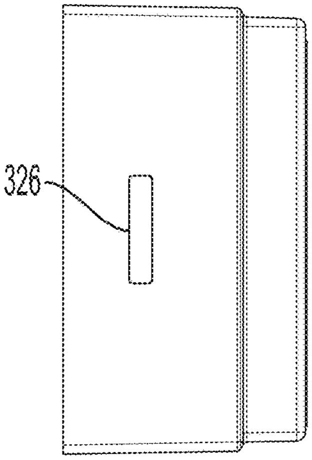
FIG. 13D depicts another side view of the sensor housing component shown in FIG. 13A.
Figure 13E:
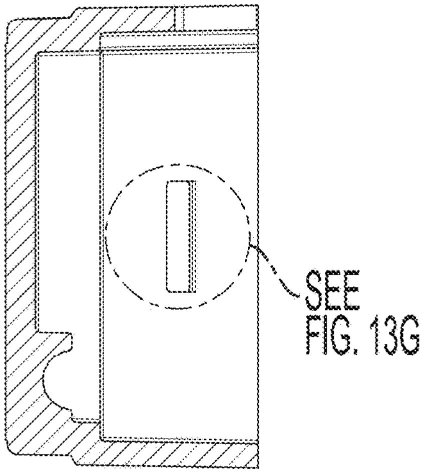
FIG. 13E depicts a cross-section view of the sensor housing component shown in FIG. 13C, taken through line 13E-13E.
Figure 13F:
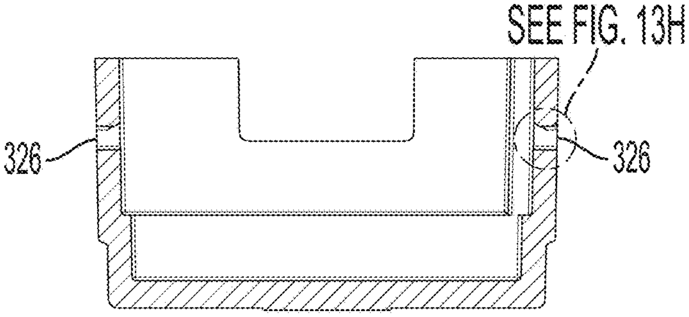
FIG. 13F depicts a cross-section view of the sensor housing component shown in FIG. 13C, taken through line 13F-13F.
Figure 13G:
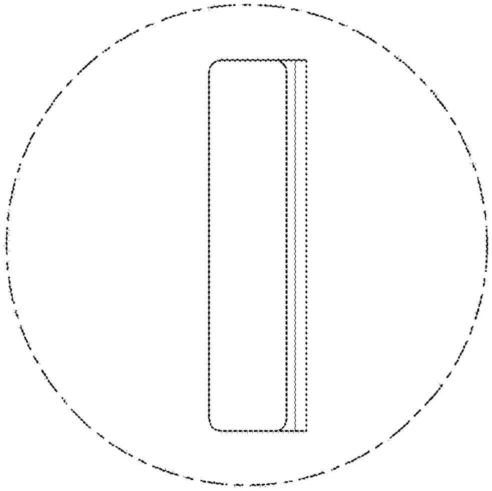
FIG. 13G depicts an enlarged view of a portion of the sensor housing component shown in FIG. 13E.
Figure 13H:
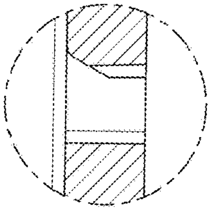
FIG. 13H depicts an enlarged view of a portion of the sensor housing component shown in FIG. 13F.
Figure 14A:
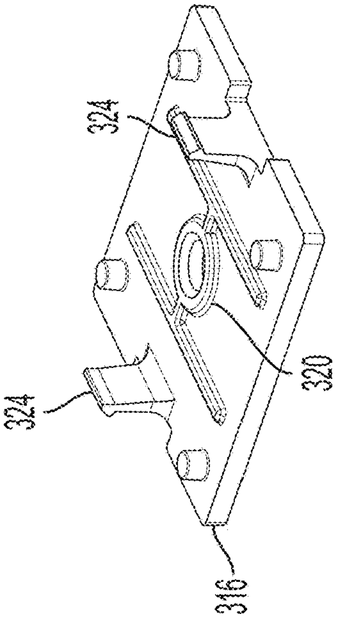
FIG. 14A depicts a perspective view of a sensor back plate of a sensor housing.
Figure 14B:
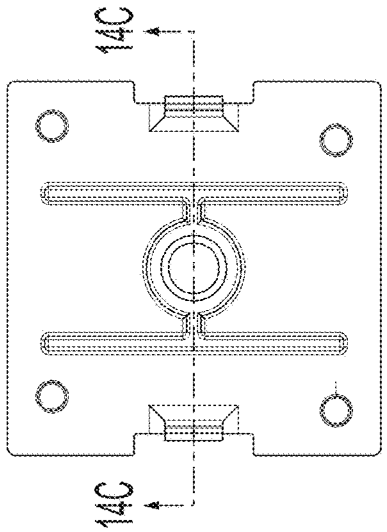
FIG. 14B depicts a top view of the sensor housing component shown in FIG. 14A.
Figure 14C:
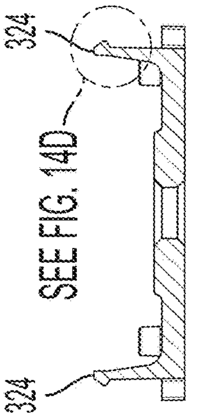
FIG. 14C depicts a cross-section view of the sensor housing component shown in FIG. 14B, taken through line 14C-14C.
Figure 14D:
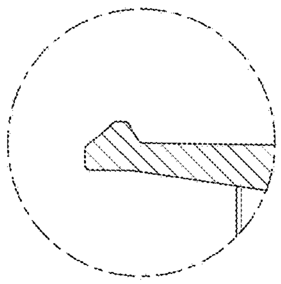
FIG. 14D depicts an enlarged view of a portion of the sensor housing component shown in FIG. 14C.
Figure 14E:
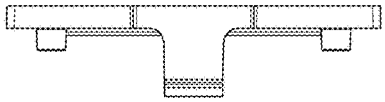
FIG. 14E depicts a side view of the sensor housing component shown in FIG. 14A.
Figure 14F:
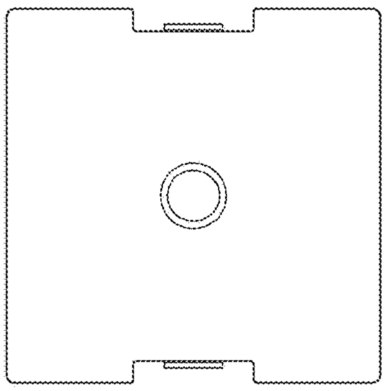
FIG. 14F depicts a bottom view of the sensor housing component shown in FIG. 14A.

As discussed above, the sensor housing 312 includes a mounting portion, such as back plate 316, configured to be positioned onto the panel 102 or the frame 104 of the enclosure. For example, as seen in FIG. 12C, the back plate 316 is configured to be mounted to the panel 102 or the frame 104 of the enclosure. As illustrated in FIGS. 14A-14F, the back plate 316 includes snap legs 324 configured for engagement to a top portion 318 of the sensor housing 312. The snap legs 324 are sized to make contact with an inner surface of the top portion 318 of the sensor housing 312. More specifically, a portion of the snap legs 324 are sized to be received by the plurality of apertures 326 defined in the top portion 318 of the sensor housing 312 (as seen in FIG. 13F) and are used to affix the top portion 318 to the back plate 316 of the sensor housing 312.

Correspondingly, the top portion 318 is configured to be fixed to the back plate 316 of the sensor housing 312 (FIGS. 14A-14F). For example, the top portion 318 of the sensor housing 312 may be releasably mounted to the back plate 316 of the sensor housing 312. The top portion 318 of the sensor housing 312 may be snap mounted to the back plate 316 of the sensor housing 312. As shown in FIGS. 13A, 13D, and 13F, the sensor housing 312 includes the plurality of apertures 326 configured for engagement with the snap legs 324 of the back plate 316, allowing for the engagement of the top portion 318 and the back plate 316 of the sensor housing 312. Further, the top portion 318 of the sensor housing 312 comprises an opening 328 (as depicted in FIGS. 11 and 13A) configured to contain a portion of electrical wiring in place, the details of which are discussed below.

Figure 11:
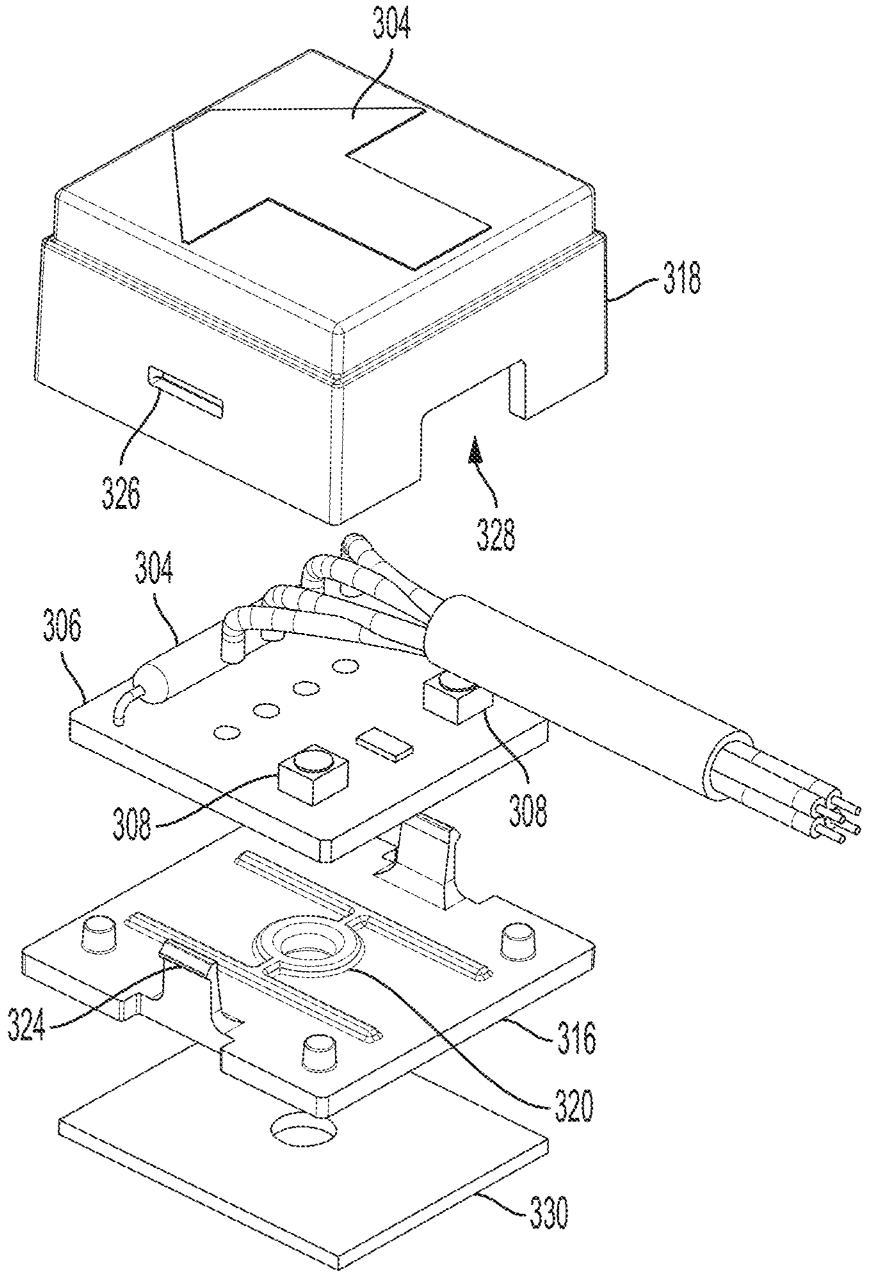
FIG. 11 depicts an exploded view of an embodiment of a sensor housing showing components therein.

It should be noted that the wiring or cable configuration illustrated in FIG. 11 differs from other embodiments in that the wiring is connected via the top surface of the circuit board (as shown), rather than via the bottom of the circuit board. Accordingly, the connection location between the wiring the circuit board can be varied according to the designer's preferences. Also, the location of the wiring connection differs relative to the location of the light sources 308 in the embodiment of FIG. 11, as compared to other embodiments illustrated herein. Accordingly, the configuration of the circuit board can also be varied according to the designer's preferences.

The sensor circuit 306, the sensor 310, and the light source 308 are positioned within the top portion 318 of the sensor housing 312. The sensor circuit 306, the sensor 310, and the light source 308 can be at least partially encapsulated via potting within the top portion 318 of the sensor housing 312.

In addition, the top portion 318 of the sensor housing 312 may be made of clear or translucent or light transmitting material to allow for passage of light from the light source 308 within the sensor housing 312. Further, as seen in FIGS. 8A-8C, the top portion 318 of the sensor housing 312 may have the directional indicator 304 configured to indicate the position of the latch cam 202 of the latch 200 when it is in the engaged position.

In accordance with another embodiment, a universal latch 200 and sensor system 300 is configured for use with an enclosure having a panel 102 and frame 104 and for latching the panel 102 relative to the frame 104. Specifically, the system comprises a latch 200 having a body 208 (FIG. 6C) configured to be mounted to the panel 102 or the frame 104 of the enclosure, the latch 200 also having a body 208 movable relative to the latch cam throughout a range of motion (FIG. 2), including an engaged position and a disengaged position. Further, the system includes a sensor 310 having a body configured to be mounted to the other of the panel 102 or the frame 104 of the enclosure, the sensor 310 also having a range (FIG. 1) throughout which it is capable of sensing the latch cam 202 of the latch 200. The sensor 310 and the latch 200 are configured to be mounted in any of a plurality of orientations in which the range of motion (FIG. 2) of the latch cam 202 of the latch 200 overlaps with the range of the sensor (FIG. 1). Additionally, the sensor 310 is configured to sense the presence or absence of the latch cam 202 of the latch 200 when the sensor 310 and the latch 200 are mounted in any of the orientations. Further, the sensor 310 is configured to sense the presence or absence of the latch cam 202 of the latch 200 when the latch cam 202 of the latch 200 is moved in the range of motion (FIG. 1) to any location within the range of the sensor 310.

Accordingly, a latch sensor according to aspects of this invention provides both door and latch status and is made to work with a wide variety of latch types and applications. Sensors can provide feedback for unsecure, secure or both conditions depending on a user's needs.

The latch and sensor system can be connected to power and ground (to switch the LEDs, for example). Additionally, it outputs two separate monitoring signals, when the reed switch is in the normally open (NO) or normally closed (NC) positions. This allows the end user to know when the switch is in either state. The state is switched by the presence of the magnetic field of the magnet that attaches to the end of a specialized cam or pawl.

The latch and sensor system communicates the latch and door status by having the NO and NC legs of the reed switch change states. The user may monitor both of these lines (via wires out from the system or a wireless interface) and when they see a change in voltage, they will know the latch status has changed. This communication can be run to a control center/data monitoring center via continuation of these data lines.

The internal switch in the sensor may be one of at least three versions; normally open, normally closed, or a single pole double throw three-wire variant. As noted, the sensor of the universal latch and sensor system can be attached to a cabinet frame or panel or other structure using tape and/or screws. The system can work with various different types of latches and can have at least 2 mm or more of compliance built in for variations in tolerance, grip length etc.

As mentioned previously, features of this invention can be embodied in new latches, latch systems, enclosures, and latch and sensor systems. Alternatively, features of this invention can be used to retrofit existing or already-installed latches (e.g., by modifying an existing latch to include a magnet or other sense-able component, by adding a sensor for use with an existing latch, and/or by otherwise retrofitting an existing or already-installed latch). Embodiments of the invention can be provided in the form of a latch, a sensor, a latch and sensor system, a latch and/or sensor kit, a partial or complete enclosure including a latch and/or sensor, a retrofit kit including a latch and/or sensor, or other configurations depending on the application.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A universal latch and sensor system configured for use with an enclosure having a panel and a frame and for latching the panel relative to the frame, the system comprising:

a latch having a body configured to be mounted to the panel or to the frame of the enclosure, the latch also having a pawl movable relative to the body throughout a range of motion including an engaging position and a disengaging position; and a sensor having a body configured to be mounted to the other of the panel or the frame of the enclosure, the sensor also having a sensing range throughout which it is capable of sensing the pawl of the latch, the body of the sensor having a facing surface, wherein the pawl of the latch in the engaging position is spaced laterally from the facing surface of the body of the sensor;

wherein the sensor and the latch are configured to be mounted in any of a plurality of orientations in which the range of motion of the pawl of the latch at least partially overlaps with the sensing range of the sensor; and wherein the sensor is configured to sense a presence or absence of the pawl of the latch when the sensor and the latch are mounted in any of the orientations and when the pawl of the latch is moved in the range of motion of the pawl to any location within the sensing range of the sensor while maintaining a gap or a space between the body of the sensor and the pawl of the latch; and wherein the pawl of the latch in the engaging position is spaced laterally from the facing surface of the body of the sensor, such that the space or the gap is maintained between the body of the sensor and the pawl of the latch when the pawl is in the engaging position.

2. The universal latch and sensor system of claim 1, wherein the body of the latch is configured to be mounted to the panel of the enclosure and the body of the sensor is configured to be mounted to the frame of the enclosure.

3. The universal latch and sensor system of claim 1, wherein the pawl of the latch is movable relative to the body along an arcuate path throughout the range of motion between the engaging position and the disengaging position.

4. The universal latch and sensor system of claim 1, wherein the sensor includes a single pole, single throw electrical switch.

5. The universal latch and sensor system of claim 1, wherein the sensor includes a single pole, double throw electrical switch.

6. The universal latch and sensor system of claim 3, wherein the body of the sensor is configured to be mounted to a planar surface and the arcuate path along which the pawl of the latch is movable is oriented along a plane substantially parallel to the planar surface.

7. The universal latch and sensor system of claim 3, wherein the body of the sensor is configured to be mounted to a planar surface and the arcuate path along which the pawl of the latch is movable is oriented along a plane angled relative to the planar surface.

8. The universal latch and sensor system of claim 3, wherein the sensing range of the sensor throughout which it is capable of sensing the pawl of the latch is a generally spherical range extending in all directions from the sensor;

wherein the sensor and the latch are configured to be mounted in any of a plurality of orientations in which the range of motion of the pawl of the latch at least partially overlaps with the generally spherical sensing range of the sensor; and wherein the sensor is configured to sense the presence or absence of the pawl of the latch when the sensor and the latch are mounted in any of the orientations and when the pawl of the latch is moved in the range of motion of the pawl to any location within the generally spherical sensing range of the sensor.

9. The universal latch and sensor system of claim 1, wherein the sensor is configured to sense the presence or absence of the pawl of the latch while maintaining the space or the gap between the body of the sensor and the pawl of the latch when the pawl is in the engaging position.

10. A universal latch and sensor system configured for use with an enclosure having a panel and a frame and for latching the panel relative to the frame, the system comprising:

a latch having a body configured to be mounted to the panel or to the frame of the enclosure, the latch also having a pawl movable relative to the body throughout a range of motion including an engaging position and a disengaging position; and a sensor housing configured to be mounted to the other of the panel or the frame of the enclosure, and a sensor positioned within the sensor housing and having a sensing range throughout which it is capable of sensing the pawl of the latch, and wherein a body of the sensor has a facing surface, wherein the pawl of the latch in the engaging position is spaced laterally from the facing surface of the body of the sensor;

wherein the sensor and the latch are configured to be mounted in any of a plurality of orientations in which the range of motion of the pawl of the latch at least partially overlaps with the sensing range of the sensor; and wherein the sensor is configured to sense the presence or absence of the pawl of the latch when the sensor and the latch are mounted in any of the orientations and when the pawl of the latch is moved in the range of motion of the pawl to any location within the sensing range of the sensor while maintaining a gap or a space between the sensor housing and the pawl of the latch; and wherein the pawl of the latch in the engaging position is spaced laterally from the facing surface of the body of the sensor, such that the space or the gap is maintained between the body of the sensor and the pawl of the latch when the pawl is in the engaging position.

* * * * *